United States Patent
Inukai et al.

(10) Patent No.: US 9,509,219 B2
(45) Date of Patent: Nov. 29, 2016

(54) POWER SUPPLY SYSTEM, IMAGE FORMING APPARATUS HAVING THE POWER SUPPLY SYSTEM, AND CONTROL METHOD OF THE POWER SUPPLY SYSTEM

(71) Applicants: Katsumi Inukai, Iwakura (JP); Hiroyuki Naganawa, Kasugai (JP)

(72) Inventors: Katsumi Inukai, Iwakura (JP); Hiroyuki Naganawa, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 171 days.

(21) Appl. No.: 14/181,212

(22) Filed: Feb. 14, 2014

(65) Prior Publication Data

US 2014/0233266 A1  Aug. 21, 2014

(30) Foreign Application Priority Data

Feb. 18, 2013  (JP) ................ 2013-028711

(51) Int. Cl.
*H02M 3/335* (2006.01)
*G03G 15/00* (2006.01)
*H02M 7/12* (2006.01)
*H02M 1/00* (2006.01)

(52) U.S. Cl.
CPC ........ *H02M 3/33507* (2013.01); *G03G 15/80* (2013.01); *H02M 7/125* (2013.01); *G03G 2215/00983* (2013.01); *H02M 2001/0006* (2013.01); *H02M 2001/0022* (2013.01); *H02M 2001/0032* (2013.01); *Y02B 70/16* (2013.01)

(58) Field of Classification Search
CPC ............... G03G 15/80; G03G 2215/00983; Y02B 70/06
See application file for complete search history.

(56) References Cited

U.S. PATENT DOCUMENTS

| | | |
|---|---|---|
| 4,910,654 A | 3/1990 | Forge |
| 5,032,968 A | 7/1991 | Mikami et al. |
| 5,231,309 A | 7/1993 | Soma et al. |
| 5,546,161 A | 8/1996 | Sakai et al. |
| 5,659,371 A | 8/1997 | Krause |

(Continued)

FOREIGN PATENT DOCUMENTS

| | | |
|---|---|---|
| JP | S47-21184 B | 6/1972 |
| JP | 62-064256 A | 3/1987 |

(Continued)

OTHER PUBLICATIONS

U.S. Office Action (Notice of Allowance) issued in related U.S. Appl. No. 14/169,487, Aug. 17, 2015.

(Continued)

*Primary Examiner* — Jessica Han
*Assistant Examiner* — Bart Iliya
(74) *Attorney, Agent, or Firm* — Merchant & Gould P.C.

(57) ABSTRACT

A power supply system includes: a switching power supply for converting an AC voltage from an AC power supply into a DC voltage; a latching relay provided on an AC input line for switching a connection state of the switching power supply with the AC power supply in response to a relay drive signal; a control device for generating a relay control signal; a relay drive circuit for generating the relay drive signal in response to an input of the relay control signal and driving the latching relay by the relay drive signal; a battery for supplying electric power to the control device and the relay drive circuit when they are connected; and a switch for switching the connection state of the battery with respect to the control device and the relay drive circuit.

13 Claims, 10 Drawing Sheets

(56) References Cited

U.S. PATENT DOCUMENTS

| | | | |
|---|---|---|---|
| 5,670,832 A * | 9/1997 | Takeda | G03G 15/5004 307/39 |
| 5,914,538 A | 6/1999 | Kurosawa et al. | |
| 6,115,266 A | 9/2000 | Matsui et al. | |
| 6,262,565 B1 * | 7/2001 | Williams | H02M 5/257 323/237 |
| 6,353,543 B2 | 3/2002 | Itoh et al. | |
| 6,408,148 B1 | 6/2002 | Yamamoto | |
| 6,476,589 B2 | 11/2002 | Umminger et al. | |
| 7,602,158 B1 | 10/2009 | Iacob | |
| 7,639,963 B2 | 12/2009 | Matsuo | |
| 8,035,940 B2 | 10/2011 | Lee | |
| 8,503,900 B2 | 8/2013 | Inukai | |
| 2004/0190923 A1 | 9/2004 | Inukai | |
| 2005/0169658 A1 | 8/2005 | Hanamoto et al. | |
| 2008/0292351 A1 * | 11/2008 | Matsuda | G03G 15/80 399/75 |
| 2008/0309163 A1 | 12/2008 | Hashimoto et al. | |
| 2009/0060558 A1 | 3/2009 | Uehara | |
| 2009/0128347 A1 | 5/2009 | Bucella | |
| 2009/0168461 A1 | 7/2009 | Nakahori | |
| 2009/0180229 A1 | 7/2009 | Lee | |
| 2009/0230781 A1 | 9/2009 | Hung et al. | |
| 2010/0001695 A1 * | 1/2010 | Arai | H02J 7/0065 320/162 |
| 2010/0060000 A1 | 3/2010 | Scholte-Wassink | |
| 2010/0122096 A1 | 5/2010 | Ozenc | |
| 2010/0256897 A1 | 10/2010 | Takata et al. | |
| 2011/0063759 A1 | 3/2011 | Billingsley et al. | |
| 2011/0064445 A1 * | 3/2011 | Yashiro | G03G 15/5004 399/88 |
| 2011/0110129 A1 | 5/2011 | Busch | |
| 2012/0025630 A1 * | 2/2012 | Tsuda | G03G 15/5004 307/125 |
| 2012/0060786 A1 | 3/2012 | Okada et al. | |
| 2012/0148273 A1 | 6/2012 | Shimura et al. | |
| 2012/0206057 A1 | 8/2012 | Kim et al. | |
| 2013/0028623 A1 | 1/2013 | Inukai | |
| 2013/0031396 A1 | 1/2013 | Inukai | |
| 2013/0038318 A1 | 2/2013 | Inukai | |
| 2013/0111237 A1 | 5/2013 | Inukai | |
| 2013/0113292 A1 | 5/2013 | Inukai | |
| 2013/0129373 A1 | 5/2013 | Inukai | |
| 2014/0210264 A1 | 7/2014 | Inukai | |
| 2014/0218827 A1 | 8/2014 | Inukai | |
| 2014/0218981 A1 | 8/2014 | Harada | |

FOREIGN PATENT DOCUMENTS

| | | |
|---|---|---|
| JP | S64-034174 A | 2/1989 |
| JP | H02-060443 A | 5/1990 |
| JP | 2-250670 A | 10/1990 |
| JP | 4-14486 U | 2/1992 |
| JP | 4-51260 A | 2/1992 |
| JP | H05-119557 A | 5/1993 |
| JP | 7-87734 A | 3/1995 |
| JP | 07-308065 A | 11/1995 |
| JP | 9-23638 A | 1/1997 |
| JP | 2000-295384 A | 10/2000 |
| JP | 2001-005350 A | 1/2001 |
| JP | 2001-025163 A | 1/2001 |
| JP | 2001-037236 A | 2/2001 |
| JP | 2001-251853 A | 9/2001 |
| JP | 2004-151998 A | 5/2004 |
| JP | 2004-187391 A | 7/2004 |
| JP | 2004-274887 A | 9/2004 |
| JP | 2004-303469 A | 10/2004 |
| JP | 2005-151672 A | 6/2005 |
| JP | 2005-221677 A | 8/2005 |
| JP | 2006-129651 A | 5/2006 |
| JP | 2007-124879 A | 5/2007 |
| JP | 2007-159344 A | 6/2007 |
| JP | 2007-244110 A | 9/2007 |
| JP | 2008-070639 A | 3/2008 |
| JP | 2008-072887 A | 3/2008 |
| JP | 2009-003424 A | 1/2009 |
| JP | 2009-284561 A | 12/2009 |
| JP | 2010-172149 A | 8/2010 |
| JP | 2010-239774 A | 10/2010 |
| JP | 2010-252574 A | 11/2010 |
| JP | 2011-120366 A | 6/2011 |
| JP | 2011-125132 A | 6/2011 |
| JP | 2011-199976 A | 6/2011 |
| JP | 2011-176911 A | 9/2011 |
| JP | 2011-212951 A | 10/2011 |
| JP | 2012-016091 A | 1/2012 |
| JP | 2013-102650 A | 5/2013 |
| WO | 97-50165 A1 | 12/1997 |

OTHER PUBLICATIONS

Office Action issued in corresponding U.S. Appl. No. 14/171,877, mailed Mar. 31, 2015.

Office Action issued in corresponding Japanese patent application No. 2011-245775, Jan. 20, 2015 (with partial English-language translation); 10 pages.

U.S. Office Action (Notice of Allowance) issued in related U.S. Appl. No. 14/169,933, mailed Jul. 7, 2015.

U.S. Office Action (Notice of Allowance) issued in related U.S. Appl. No. 14/171,877, Jun. 6, 2016.

U.S. Office Action (Notice of Allowance) issued in related U.S. Appl. No. 14/171,877,487, Jan. 25, 2016.

U.S. Office Action issued in related U.S. Appl. No. 13/629,511, mailed Jun. 19, 2015.

Office Action issued in corresponding Japanese patent application No. 2013-021195, Jul. 21, 2016 (with partial English-language translation); 9 pages.

Office Action issued in corresponding Japanese patent application No. 2013-018217, Jul. 28, 2016 (with partial English-language translation); 6 pages.

Office Action issued in corresponding Japanese patent application No. 2013-028711, Jul. 28, 2016 (with partial English-language translation); 9 pages.

Office Action issued in corresponding Japanese patent application No. 2013-0017705, Aug. 2, 2016 (with English-language translation); 20 pages.

\* cited by examiner

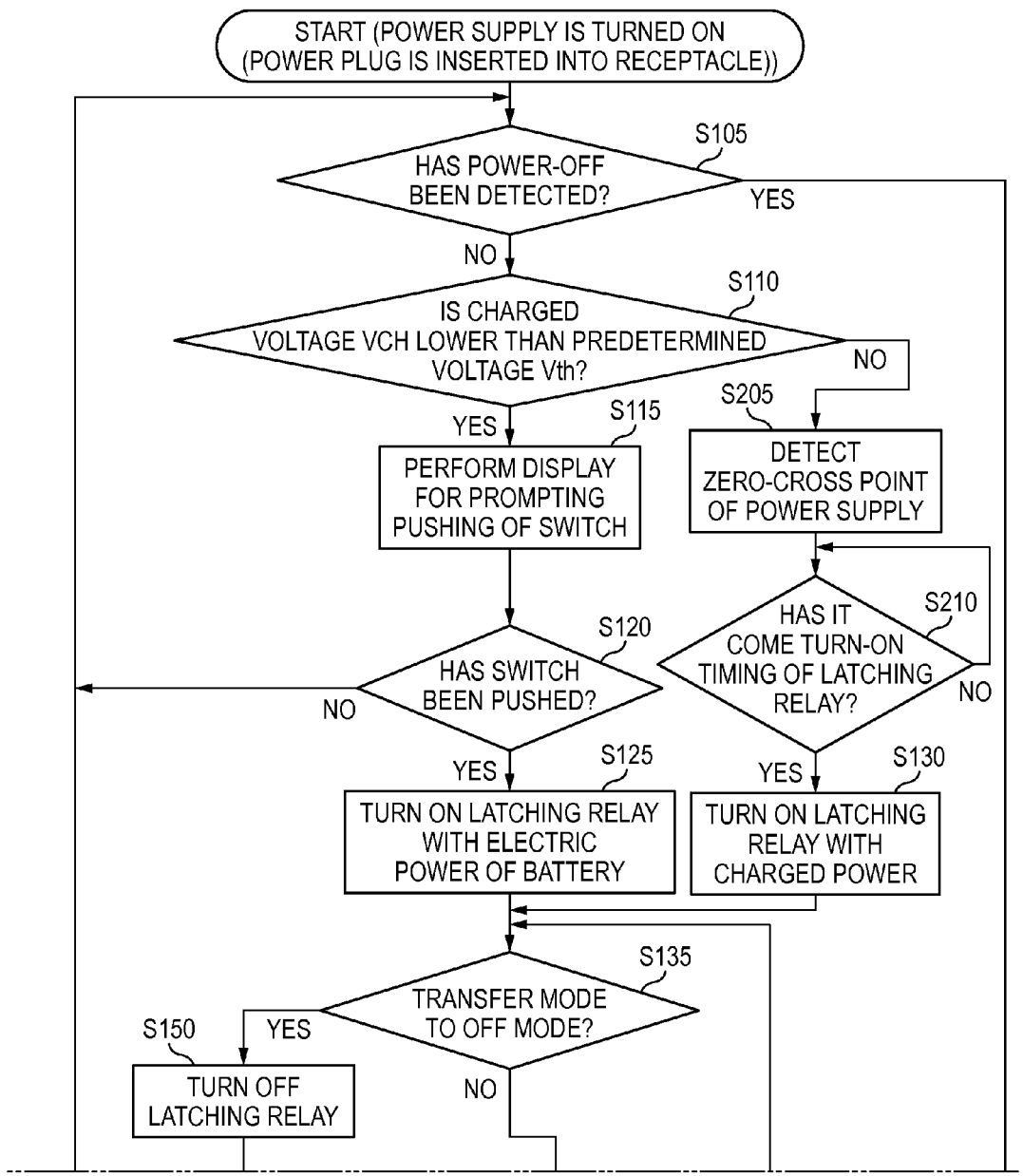

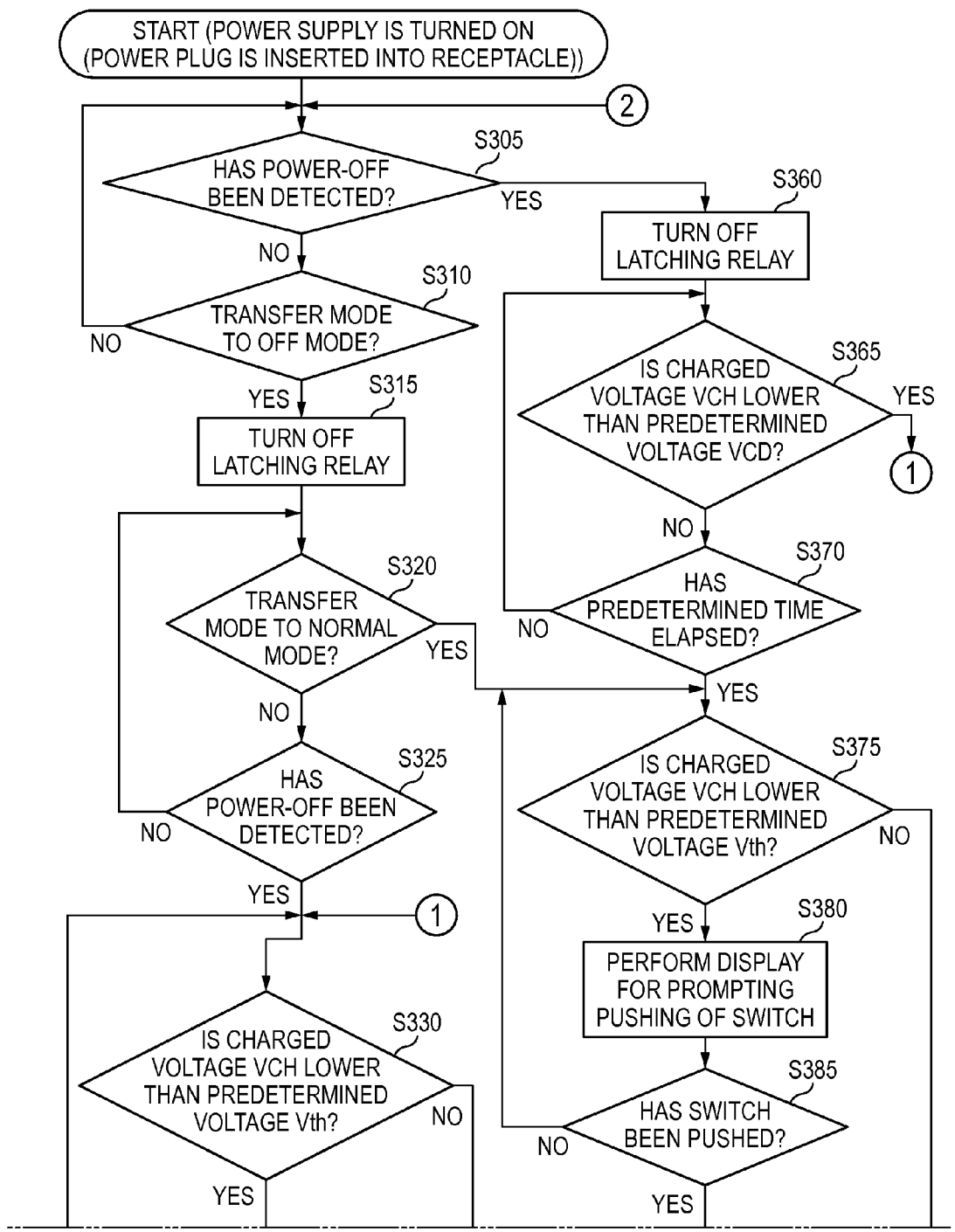

POWER SUPPLY SYSTEM, IMAGE FORMING APPARATUS HAVING THE POWER SUPPLY SYSTEM, AND CONTROL METHOD OF THE POWER SUPPLY SYSTEM

CROSS-REFERENCE TO RELATED APPLICATIONS

This application claims priority from Japanese Patent Application No. 2013-028711 filed on Feb. 18, 2013, the entire subject-matter of which is incorporated herein by reference.

TECHNICAL FIELD

The present invention relates to a power supply system, an image forming apparatus having the power supply system, and a control method of the power supply system, and particularly, to a technology for reducing the power consumption of a power supply system.

BACKGROUND

As an example of a technology for reducing the power consumption of a power supply system according to the related art, there has been proposed a technology in which, during standby, a main power supply control unit stops oscillation of an output transformer of a switching power supply, and a secondary battery performs supply of electric power to the main power supply control unit, whereby the power consumption is reduced.

SUMMARY

Illustrative aspects of the present invention provide a technology for further reducing the power consumption with respect to a power supply.

According to one illustrative aspect of the present invention, there is provided a power supply system comprising: a switching power supply configured to convert an AC voltage from an AC power supply into a predetermined DC voltage and to output the DC voltage; a latching relay, which is provided at a preceding stage of the switching power supply on an AC input line, and which is configured to switch a connection state of the switching power supply with the AC power supply in response to an input of a relay drive signal; a control device configured to generate a relay control signal for controlling the latching relay; a relay drive circuit configured to generate the relay drive signal in response to an input of the relay control signal, and to drive the latching relay by the relay drive signal; a battery configured to supply electric power to the control device and the relay drive circuit in a case where the control device and the relay drive circuit are connected; and a switch configured to switch the connection state of the battery with respect to the control device and the relay drive circuit.

According to another illustrative aspect of the present invention, there is provided an image forming apparatus comprising: the power supply system according to the above aspect; and an image forming unit configured to form an image with using the DC voltage supplied from the switching power supply.

BRIEF DESCRIPTION OF THE DRAWINGS

FIGS. 6A and 6B are flow charts schematically illustrating a relay control process according to the second illustrative embodiment;

FIGS. 8A and 8B are flow charts schematically illustrating a relay control process according to the third illustrative embodiment.

DETAILED DESCRIPTION

<General Overview>

Figure 1:
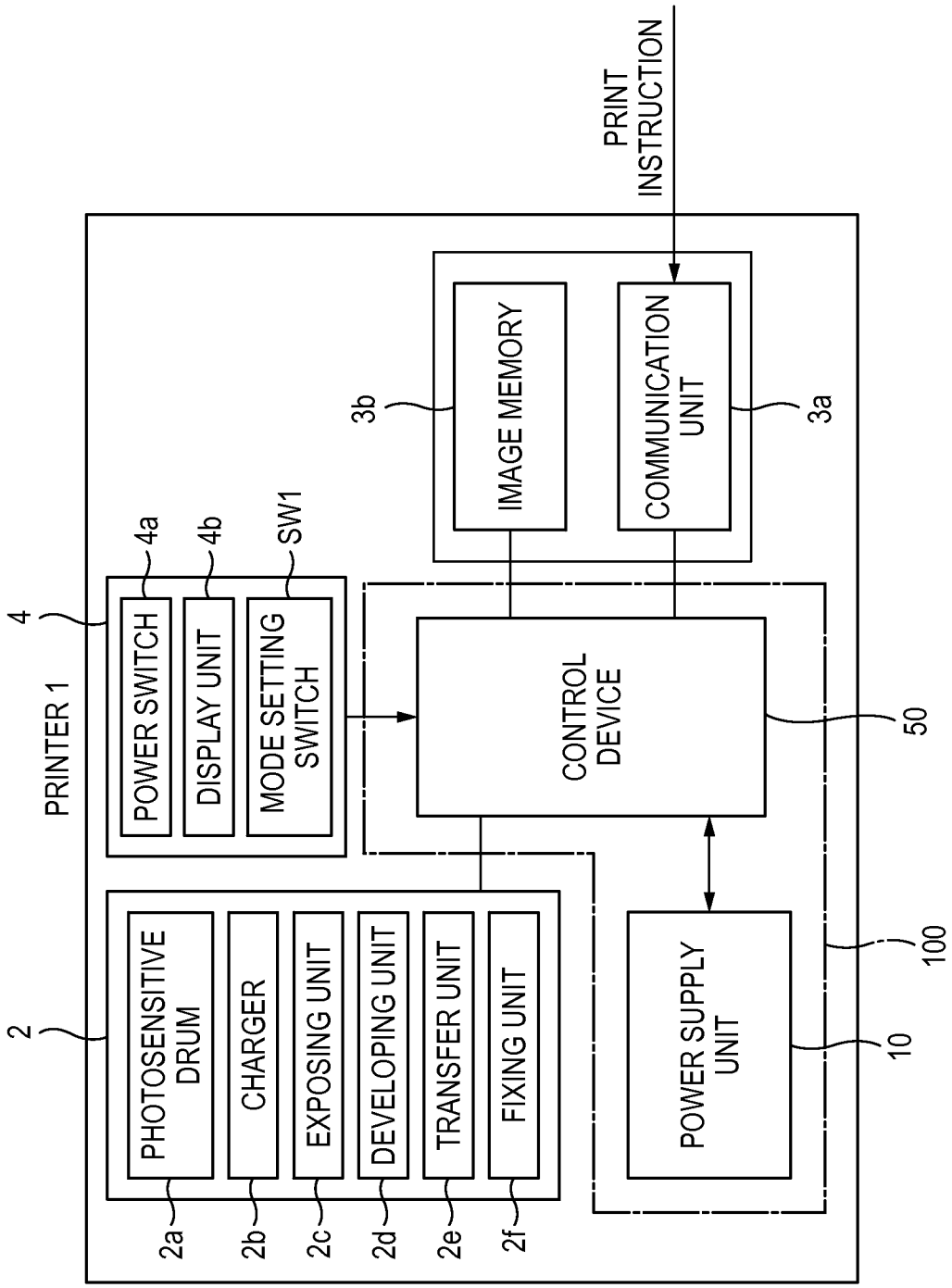
FIG. 1 is a block diagram illustrating a schematic configuration of an image forming apparatus according to a first illustrative embodiment.

The above-described related art has some disadvantages. For example, even if oscillation of the switching power supply is stopped, it may be feared that a leakage current will flow in a smoothing electrolytic capacitor provided on the primary side of the output transformer. In a case where a leakage current flows, due to the leakage current, unnecessary power may be consumed.

Therefore, illustrative aspects of the present invention provide a technology for further reducing the power consumption with respect to a power supply.

According to a first illustrative aspect of the present invention, there may be provided a power supply system comprising: a switching power supply configured to convert an AC voltage from an AC power supply into a predetermined DC voltage and to output the DC voltage; a latching relay, which is provided at a preceding stage of the switching power supply on an AC input line, and which is configured to switch a connection state of the switching power supply with the AC power supply in response to an input of a relay drive signal; a control device configured to generate a relay control signal for controlling the latching relay; a relay drive circuit configured to generate the relay drive signal in response to an input of the relay control signal, and to drive the latching relay by the relay drive signal; a battery configured to supply electric power to the control device and the relay drive circuit in a case where the control device and the relay drive circuit are connected; and a switch configured to switch the connection state of the battery with respect to the control device and the relay drive circuit.

According thereto, it is possible to disconnect the switching power supply and the AC power by the latching relay, for example, in a power saving mode. Therefore, it is possible to suppress a current from leaking at the switching power supply, and thus it is possible to reduce power consumption. Further, even in a case where electric power from the AC power is not supplied, the battery is connected to the control device and the relay drive circuit by the switch, whereby it is possible to drive the latching relay. Therefore, even in a case where the power supply is off in a state where the switching power supply and the AC power supply are in the disconnection state, in a case where the power supply is turned on in next time, it is possible to connect the switching power supply and the AC power.

According to a second illustrative aspect of the present invention, the power supply system may further comprise a storage circuit, which is charged by supply of electric power from the switching power supply, and which is configured to apply a charged voltage to a power supply line. The control device may comprise a mode setting terminal for setting any one of a power saving mode, in which the switching power supply and the AC power supply are in a disconnection state, and a normal mode, in which the switching power supply and the AC power supply are in a connection state. The control device may be configured to be supplied with electric power from the storage circuit through the power supply line in the power saving mode. The switch may further function as a mode setting switch for setting the power saving mode or the normal mode. The switch may comprise: a first contact point, which is connected to the battery; and a second contact point, which is connected to the mode setting terminal and to the power supply line through a first diode.

According thereto, it is possible to combine a switch for setting a mode and a switch for connection of the battery.

According to a third illustrative aspect of the present invention, the charged voltage of the storage circuit in the normal mode may be set to be higher than a battery voltage of the battery by a predetermined value.

According thereto, even if the switch is pushed in the normal mode, a current does not flow from the battery into the power supply line through the first diode. That is, it is possible to prevent a current from unnecessarily flowing from the battery, and thus it becomes possible to reduce the capacity of the battery. Therefore, it becomes possible to reduce the size and cost of the battery.

According to a fourth illustrative aspect of the present invention, the power supply system may further comprise: a signal generating circuit configured to generate a zero-cross detection signal corresponding to a zero-cross point of the AC power supply. The control device may be configured to generate the relay control signal in response to the zero-cross detection signal. The relay drive circuit may be configured to drive the latching relay in response to the zero-cross detection signal.

In general, in the vicinity of a zero-cross point of the AC power supply, an AC voltage or an AC current is very close to zero. For this reason, according to this configuration, in response to a zero-cross point, the latching relay is driven with electric power of the battery, for example, by pushing of the switch, whereby it is possible to suppress an inrush current from flowing in the switching power supply when the AC power supply is connected to the switching power supply.

According to a fifth illustrative aspect of the present invention, the power supply system may further comprise a thermistor that is provided at a preceding stage of the latching relay on the AC input line.

With respect to resistance, the thermistor has a negative temperature characteristic in which as temperature rises, resistance decreases. Therefore, according to this configuration, on the occasion of driving the latching relay with electric power of the battery by pushing of the switch, thereby connecting the AC power supply to the switching power supply, in a case where the temperature of the thermistor is low, it is possible to suppress an inrush current from flowing in the switching power supply.

According to a sixth illustrative aspect of the present invention, the power supply system may further comprise a power detecting unit configured to detect existence/non-existence of supply of the AC power supply to the power supply system. In a case where the non-existence of supply of the AC power supply is detected, on an occasion of driving the latching relay by supplying the electric power to the control device and the relay drive circuit from the battery, the latching relay may be driven after a thermistor cooling period which is a predetermined time period has elapsed, whereby the AC power supply and the switching power supply are connected.

According thereto, even in a case where ON/OFF (existence/non-existence) of supply of the AC power is continuously performed, it is possible to reduce an inrush current flowing into the switching power supply.

According to a seventh illustrative aspect of the present invention, the thermistor cooling period may be set to a time period in which the charged voltage drops to a predetermined voltage enabling driving of the latching relay.

According thereto, it is possible to drive the latching relay by electric power of the storage circuit, instead of electric power of the battery.

According to an eighth illustrative aspect of the present invention, in a case where non-existence of supply of the AC power supply is detected during the power saving mode in which the switching power supply and the AC power supply are in the disconnection state, and in a case where non-existence of supply of the AC power supply is detected during the normal mode in which the switching power supply and the AC power supply are in the connection state, different voltage values may be set as the predetermined voltage, respectively.

In this case, a case where the power supply system has been powered off during the OFF mode, and a case where the power supply has been powered off during the normal mode are different in the thermistor temperature. That is, the thermistor temperature in the case where the power supply has been powered off during the normal mode is higher than that in the case where the power supply system has been powered off during the OFF mode. For this reason, the predetermined voltage is set to different values for those cases, whereby it is possible to set a thermistor cooling period corresponding to each case.

According to a ninth illustrative aspect of the present invention, in a case where a predetermined time period elapses before the charged voltage drops to be lower than the predetermined voltage, the control device may be configured to determine that there is supply of the AC power supply and to drive the latching relay so as to connect the switching power supply and the AC power supply.

According thereto, even in a case where the power supply system is powered off during the normal mode, and then is powered on after a short time, it is possible to surely reduce an inrush current.

According to a tenth illustrative aspect of the present invention, upon the non-existence of supply of the AC power supply is detected during the normal mode in which the switching power supply and the AC power supply are in the connection state, the control device may be configured to immediately drive the latching relay so as to disconnect the switching power supply and the AC power supply.

According thereto, it is possible to set the thermistor cooling period as long as possible, and even in a case where the power supply system is powered off during the normal mode, it is possible to surely reduce an inrush current.

According to an eleventh illustrative aspect of the present invention, the power supply system may further comprise a second diode that is provided on the power supply line between a contact point of the power supply line and the storage circuit and a contact point of the power supply line and the relay drive circuit. The second diode may be provided in a direction to block a current flowing from the battery to the storage circuit in a case where the battery is connected to the control device and the relay drive circuit by the switch.

According thereto, in a case where the switch is pushed when the charged voltage of the storage circuit is lower than the battery voltage, it is possible to block a current flowing from the battery into the storage circuit by the second diode. Therefore, it becomes possible to further reduce the capacity of the battery.

According to a twelfth illustrative aspect of the present invention, the power supply system may further comprise a low-capacity power supply circuit, which is connected to the AC input line at a preceding stage of the latching relay, and which is configured to supply a predetermined electric power in the power saving mode. The low-capacity power supply circuit may comprise: a first capacitor that has a first electrode, which is connected to a first end of the AC power supply, and a second electrode; a second capacitor that has a first electrode, which is connected to a second end of the AC power supply, and a second electrode; a rectifying circuit, which is electrically connected between the second electrode of the first capacitor and the second electrode of the second capacitor, and which is configured to rectify an AC voltage to be applied to the first capacitor and the second capacitor; and a smoothing capacitor, which is connected at a subsequent stage of the rectifying circuit, and which is configured to smoothen the AC voltage. The storage circuit may be configured by the smoothing capacitor and is configured to receive supply of electric power from the low-capacity power supply circuit in the power saving mode in which the switching power supply and the AC power supply are in the disconnection state.

According thereto, it is possible to use the low-capacity power supply circuit having a simple configuration to generate electric power in the power saving mode.

According to a thirteenth illustrative aspect of the present invention, there is provided an image forming apparatus comprising: the power supply system according to the above illustrative aspects; and an image forming unit configured to form an image with using the DC voltage supplied from the switching power supply.

According thereto, in the image forming apparatus, it is possible to reduce the power consumption of the power supply system, and thus it is possible to reduce the power consumption during standby of the image forming apparatus when the switching power supply is not used.

According to the illustrative aspects of the present invention, during the power saving mode in which the switching power supply is not used, supply of AC electric power to the switching power supply is completely turned off by the latching relay, whereby it is possible to suppress a leakage current. Further, since the battery for driving the relay is provided, for example, during power-on, in a case where the switching power supply and the AC power supply are in the disconnection state, it is possible to turn on the latching relay with electric power of the battery, thereby connecting the switching power supply and the AC power supply. Therefore, during power-on, it is possible to quickly start up the switching power supply.

ILLUSTRATIVE EMBODIMENTS (First Illustrative Embodiment)

Illustrative embodiments will be described with reference to FIGS. 1 to 4.

1. Printer

FIG. 1 is a block diagram illustrating an electrical configuration of a printer 1 which is an example of an image forming apparatus. The printer 1 includes a printing unit 2, a communicating unit 3a, an image memory 3b, an operation panel 4, and a power supply system 100. The power supply system 100 includes a power supply unit 10 and a control device 50. The power supply unit 10 serves as the power supply of the printer 1, and supplies electric power to the printing unit 2, the communicating unit 3a, the image memory 3b, and the control device 50.

The printing unit 2 includes a photosensitive drum 2a, a charging unit 2b for performing a charging process of charging the surface of the photosensitive drum 2a, an exposing unit 2c for performing an exposing process of forming an electrostatic latent image on the surface of the photosensitive drum 2a, a developing unit 2d for performing a developing process of attaching developer onto the electrostatic latent image formed on the surface of the photosensitive drum 2a so as to form a developer image, a transfer unit 2e for performing a transferring process of transferring the developer image onto a recording medium, a fixing unit 2f for performing a fixing process of fixing the developer image transferred on the recording medium, and the like.

The printing unit 2 performs the charging process, the exposing process, the developing process, the transferring process, and the fixing process, thereby performing a printing process of printing an image based on print data onto a recording medium. The communication unit 3a performs communication with an information terminal device such as a PC, and takes on a function of receiving print instructions and print data from the information terminal device. The image memory 3b temporarily stores print data received from the information terminal device.

The operation panel 4 includes a plurality of operation buttons including a power switch 4a and a mode setting switch (an example of a switch) SW1, and a display unit 4b such as a liquid crystal panel. An operation command such as a copy command to the printer 1 is issued by an operation of the user on the operation panel 4.

In the printer 1, if the communication unit 3a receives a print instruction and receives print data from the information terminal device, the control device 50 controls the printing unit 2 such that the printing unit 2 performs the printing process composed of the charging process, the exposing process, the developing process, the transferring process, and the fixing process so as to print images based on the print data onto recording media. An operating voltage of the printing unit 2 is mainly 24 V; whereas operating voltages of the communication unit 3a, the image memory 3b, and the control device 50 are 5 V and 3.3 V.

The printer 1 has, as operation modes, a normal mode and an OFF mode (one example of a power saving mode). The normal mode is a mode in which the printer 1 is able to perform the printing process immediately in response to a print instruction, or in which the printer 1 is performing the printing process. Therefore, in the normal mode, the power supply system 100 operates, and in this state, supply of electric power to the fixing unit 2f is controlled such that the fixing unit 2f is maintained at a temperature at which fixing is possible or a temperature slightly lower than the temperature at which fixing is possible. The OFF mode is a power saving mode which the printer 1 enters if any print instruction is not received for a predetermined period, and in which the printer 1 is in a standby state. In the OFF mode, only a portion of the power supply system 100 operates, and electric power is not supplied to the fixing unit 2f. Incidentally, in the present illustrative embodiment, a normal mode and OFF mode of the power supply system 100 correspond to the normal mode and OFF mode of the printer 1.

Incidentally, the OFF mode is a mode having power consumption less than that in a so-called sleep mode. In the sleep mode, electric power is supplied to the communicating unit 3a; whereas in the OFF mode, electric power is not supplied to the communicating unit 3a and thus data communication with the outside is not possible.

2. Configuration of Power Supply System

Subsequently, the configuration of the power supply system 100 will be described with reference to FIG. 2. As described above, the power supply system 100 includes the power supply unit 10 and the control device 50. First, the configuration of the power supply unit 10 will be described. The power supply unit 10 includes a switching power supply 20, a low-capacity power supply circuit 30, a latching relay 40, a relay drive circuit 60, a battery Ba and the mode setting switch SW1.

The latching relay 40 is provided on an AC input line Lin, and switches a connection state of the switching power supply 20 with respect to an AC power supply AC, in response to input of a relay drive signal Sd from the relay drive circuit 60. The latching relay 40 includes, for example, a movable piece 41, a contact 42, and a relay coil 43 for driving the movable piece 41. The movable piece 41 is connected to the AC power supply AC, for example, through the AC input line Lin. On the other hand, the contact 42 is connected to the switching power supply 20 through the AC input line Lin.

The latching relay 40 is a so-called self-holding type relay, and whenever the relay coil 43 is excited, the connection state of the movable piece 41 and the contact 42 is switched. After the connection state of the movable piece 41 and the contact 42 is switched, even if the excitation of the relay coil 43 is interrupted, in the latching relay 40, that state is held until the relay coil 43 is excited in next time.

Due to excitation of the relay coil 43, the movable piece 41 and the contact 42 are connected, whereby the switching power supply 20 and the AC power supply AC are connected. Hereinafter, this will be stated as the latching relay (hereinafter, referred to simply as a relay) 40 is turned on, or becomes an ON state. On the other hand, due to excitation of the relay coil 43, the movable piece 41 and the contact 42 are disconnected, whereby the switching power supply 20 and the AC power supply AC are disconnected. Hereinafter, this will be stated as the relay 40 is turned off, or becomes an OFF state.

Figure 2:
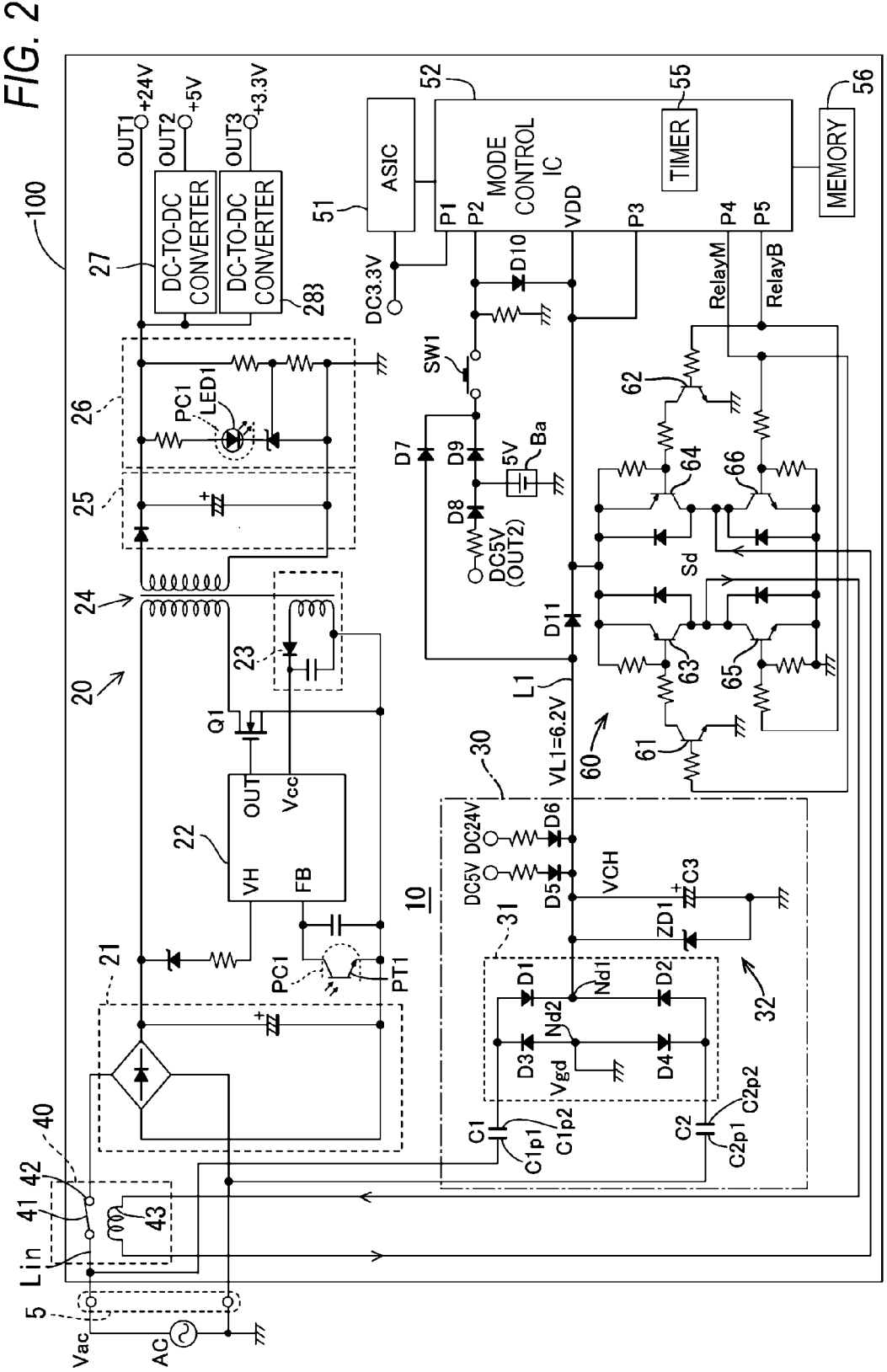
FIG. 2 is a block diagram illustrating a schematic configuration of a power supply system according to the first illustrative embodiment.

FIG. 2 shows a case where the relay 40 is in the ON state. In the case where the relay 40 is in the ON state, when the power switch 4a of the printer 1 is turned on, or when the power plug 5 of the printer 1 is plugged into a power receptacle, the AC power supply AC and the switching power supply 20 are connected, whereby AC electric power is supplied to the switching power supply 20. In the present illustrative embodiment, during power-on of the printer 1, the relay 40 is in the ON state, and thus AC electric power is not supplied to the switching power supply 20 at the same time as power-on of the printer 1.

The switching power supply 20 includes a rectifying/smoothing circuit 21, a control IC 22, a voltage generating circuit 23, a transformer 24, a field effect transistor (FET) Q1, a rectifying/smoothing circuit 25, a voltage detecting circuit 26, and DC-to-DC converters 27 and 28. The switching power supply 20 is connected to the AC input line Lin through the relay 40.

In the normal mode, the switching power supply 20 rectifies and smoothes an AC voltage Vac of the AC power supply AC so as to generate DC voltages of +24 V, +5 V, and +3.3 V. The DC voltage of +24 V (hereinafter, referred to as DC 24 V) is output from a first output terminal OUT1, the DC voltage of +5 V (hereinafter, referred to as DC 5 V) is output from a second output terminal OUT2, and the DC voltage of +3.3V (hereinafter, referred to as DC 3.3 V) is output from a third output terminal OUT3.

The rectifying/smoothing circuit 21 is a so-called capacitor input type, and includes a bridge diode for rectifying the AC voltage Vac (for example, 240 V) of the AC power supply AC, and a smoothing capacitor for smoothing the rectified voltage. An output of the rectifying/smoothing circuit 21 is applied to a primary coil of the transformer 24.

The transistor Q1 is an N-channel MOSFET, and is turned on or off in response to an on/off signal (PWM signal) given to the gate of the transistor Q1 by the control IC 22. As a result, the primary side of the transformer 24 oscillates such that a voltage is induced at a secondary coil of the transformer 24.

Moreover, on the primary side of the transformer 24, the voltage generating circuit 23 is provided. The voltage generating circuit 23 rectifies and smoothes a voltage induced at an auxiliary coil provided on the primary side of the transformer 24, thereby generating a power supply voltage Vcc for the control IC 22.

Further, the rectifying/smoothing circuit 25 rectifies and smoothes the voltage induced at the secondary coil of the transformer 24, thereby generating DC 24 V.

The voltage detecting circuit 26 includes a photocoupler PC1, and makes a light emitting diode LED1 of the photocoupler PC1 emit light in response to the detected level of the DC 24 V output by the switching power supply 20. The photocoupler PC1 includes a phototransistor PT1 connected to a feedback port FB of the control IC 22. Therefore, a light signal of the light emitting diode LED 1 is converted into an electric signal by the phototransistor PT1, and the detected value of the output of DC 24 V is fed back to the feedback port FB of the control IC 22.

The DC-to-DC converter 27 is configured to convert DC 24 V into DC 5 V and output DC 5 V, and the DC-to-DC converter 28 is configured to convert DC 24 V into DC 3.3 V and output DC 3.3 V.

In an output mode, the control IC 22 makes the primary side of the transformer 24 oscillate to generate each DC voltage, and in an output stop mode, the relay 40 is turned off, whereby supply of power to the control IC 22 is interrupted whereby the operation is stopped. Therefore, in the output stop mode, any DC voltage is not output from the switching power supply 20. When the printer 1 returns from the OFF mode to the normal mode, the relay 40 is turned on, whereby supply of power to the control IC 22 restarts, and oscillation of the primary side of the transformer 24 starts. As a result, each DC voltage is output from the switching power supply 20. Here, the OFF mode and normal operation of the printer 1 correspond to the output stop mode and output mode of the switching power supply 20. Incidentally, during start-up of the switching power supply 20, a power supply voltage is supplied to an input port VH.

Next, the configuration of the control device 50 (an example of a control device) of the power supply system 100 will be described. The control device 50 includes an application-specific integrated circuit (ASIC) 51, and a mode control IC 52 (an example of the control device).

In the normal mode, the ASIC 51 receives DC 3.3 V from the DC-to-DC converter 28 of the switching power supply 20 so as to become an operation state and mainly controls the printing unit 2 of the printer 1. On the other hand, if the switching power supply 20 transitions to the output stop mode, that is, the OFF mode, supply of power from the switching power supply 20 is interrupted, and thus the ASIC 51 becomes a stop state.

The mode control IC 52 is connected to a power supply line L1 which is the output line of the low-capacity power supply circuit 30, and receives DC 5.6 V as power VDD from a smoothing/storage capacitor (an example of a smoothing capacitor and an storage circuit) C3 through the power supply line L1. That is, in the normal mode and the OFF mode, the mode control IC 52 receives supply of electric power from the low-capacity power supply circuit 30.

Further, the mode control IC 52 is connected to the mode setting switch SW1 provided in the operation panel 4, through a port P2 (an example of a mode setting terminal), and switches the mode, for example, from the normal mode to the OFF mode, in a case where the mode setting switch SW1 is turned off by an operation of the user. On the other hand, in a case where the mode setting switch SW1 is turned on by the user, the mode control IC 52 switches the mode, for example, from the OFF mode to the normal mode.

Further, the mode control IC 52 is connected to the power supply line L1 through a port P3, and monitors the voltage VL1 of the power supply line (an example of a power supply line) L1, that is, the charged voltage VCH of the smoothing/storage capacitor C3. Further, the mode control IC 52 generates a relay control signal RelayM for turning on the relay 40, and a relay control signal RelayB for turning off the relay 40, and outputs the relay control signal RelayM and the relay control signal RelayB to the relay drive circuit 60 through a port P4 and a port P5, respectively.

That is, in the OFF mode, the mode control IC 52 generates the relay control signal RelayB for disconnecting the switching power supply 20 and the AC power supply AC, and outputs the relay control signal RelayB to the relay drive circuit 60. As a result, the operation of the switching power supply 20 stops, and in the OFF mode, electric power is supplied to the relay drive circuit 60 and the mode control IC 52 only by the low-capacity power supply circuit 30.

On the other hand, in the normal mode, the mode control IC 52 generates the relay control signal RelayM for connecting the switching power supply 20 and the AC power supply AC, and outputs the relay control signal RelayM to the relay drive circuit 60. As a result, in the normal mode, the operation of the switching power supply 20 becomes possible.

The relay drive circuit 60 is a known circuit for driving a one-wire latching relay, and includes six transistors 61 to 66, a plurality of protective diodes, and a plurality of protective resistors, and the like.

If the relay drive circuit 60 receives the relay control signal RelayM from the mode control IC 52, the transistors 61, 63, and 66 are turned on, and a relay driving current (one example of a relay drive signal Sd) from the power supply line L1 flows into the ground through the transistor 63, the relay coil 43, and the transistor 66, as shown in FIG. 2, whereby the relay 40 is turned on. In this case, the switching power supply 20 and the AC power supply AC are connected, and if AC electric power is supplied, the mode transitions to the normal mode in which the switching power supply 20 operates.

On the other hand, if the relay drive circuit 60 receives the relay control signal RelayB from the mode control IC 52, the transistors 62, 64, and 65 are turned on, and the relay driving current from the power supply line L1 flows into the ground through the transistor 64, the relay coil 43, and the transistor 65, whereby the relay coil 43 is excited in the reverse direction, and the relay 40 is turned off. In this case, the switching power supply 20 and the AC power supply AC are disconnected, and the mode transitions to the OFF mode in which the switching power supply 20 stops the operation.

A memory 56 includes a ROM and a RAM. In the ROM, a variety of programs to be executed by the control device 50 are stored, and in the RAM, a variety of data during execution of programs is stored.

The voltage of a battery Ba is almost 5V. Further, in the present illustrative embodiment, the battery Ba is a chargeable battery, and is connected to the output terminal OUT2 of the switching power supply 20 through a diode D8 such that the battery Ba can be charged with DC 5 V. Incidentally, the battery Ba does not necessarily need to be connected to DC 5 V through the diode D8. That is, the battery Ba does not need to be a chargeable battery, and the diode D8 or the like may be omitted.

The battery Ba is connected to one contact point of the mode setting switch SW1, and the other contact point of the mode setting switch SW1 is connected to the port P2 of the mode control IC 52, and is also connected to the power supply line L1 through a diode D10 (an example of a first diode).

That is, in the present illustrative embodiment, the mode setting switch SW1 further functions as a switch for switching the connection state of the battery Ba with the mode control IC 52 and the relay drive circuit 60. Therefore, in a case where the mode setting switch SW1 is turned on by the user, whereby the battery Ba is connected to the mode control IC 52 and the relay drive circuit 60, the battery Ba supplies electric power to the mode control IC 52 and the relay drive circuit 60.

Therefore, during power-on of the printer 1, for example, when the power plug 5 is plugged in a power receptacle, the relay 40 is in an ON state, and even in a case where electric power from the AC power supply AC is not supplied, the battery Ba is connected to the mode control IC 52 and the relay drive circuit 60 by the mode setting switch SW1, whereby it is possible to drive the relay 40, thereby turning on the relay 40. Therefore, even though the power plug 5 is pulled out from the power receptacle in a state where the switching power supply 20 and the AC power supply AC is in the disconnection state, whereby the power supply of the printer 1 is turned off, in a case where the power supply is turned on in next time, it is possible to connect the switching power supply 20 and the AC power supply AC.

Further, it is possible to use one switch SW1 not only as a switch for setting a mode but also as a switch for connection of the battery.

Further, a diode D11 (an example of a second diode) is provided on the power supply line L1 between the contact point of the power supply line L1 and the smoothing/storage capacitor C3, and the contact point of the power supply line L1 and the relay drive circuit 60. Further, the diode D11 is provided in a direction to block a current flowing from the battery Ba into the smoothing/storage capacitor C3 in a case where the battery Ba is connected to the mode control IC 52 and the relay drive circuit 60 by the mode setting switch SW1. That is, the anode of the diode D11 is connected to the smoothing/storage capacitor C3, and the cathode of the diode D11 is connected to the relay drive circuit 60.

As a result, it is possible to use the diode D11 to prevent a current from flowing from the battery Ba into the smoothing/storage capacitor C3 in a case where the mode setting switch SW1 is pushed when the charged voltage VCH of the smoothing/storage capacitor C3 is lower than the battery voltage VBa. Therefore, it becomes possible to further reduce the capacity of the battery Ba. Incidentally, according to the set value of the charged voltage VCH, the diode D11 is not necessarily needed, and may be omitted.

3. Configuration of Low-capacity Power Supply Circuit

Subsequently, the low-capacity power supply circuit 30 will be described. The low-capacity power supply circuit 30 supplies electric power to the mode control IC 52 and the relay drive circuit 60 in the OFF mode and the normal mode. In the normal mode, the low-capacity power supply circuit 30 supplies electric power from the AC power supply AC directly to them, or supplies electric power from DC 5V of the switching power supply 20 to them through a diode D5. In the OFF mode, the low-capacity power supply circuit 30 supplies electric power from a smoothing capacitor C3 through the rectifying circuit 31.

The low-capacity power supply circuit 30 includes a first capacitor C1, a second capacitor C2, the rectifying circuit 31, and a smoothing circuit 32.

The first capacitor C1 includes a first electrode C1$p$1 and a second electrode C1$p$2, and the first electrode C1$p$1 is connected to one end of the AC power supply AC through the AC input line Lin, and the second electrode C1$p$2 is connected to the rectifying circuit 31.

The second capacitor C2 includes a first electrode C2$p$1 and a second electrode C2$p$2, and the first electrode C2$p$1 is connected to the other end of the AC power supply AC, and the second electrode C2$p$2 is connected to the rectifying circuit 31.

The rectifying circuit 31 is electrically connected between the second electrode C1$p$2 of the first capacitor C1 and the second electrode of the second capacitor C2, and rectifies the AC voltage Vac to be applied to both capacitors C1 and C2. In the present illustrative embodiment, the rectifying circuit 31 is configured by a bridge circuit composed of four diodes D1, D2, D3, and D4. The cathodes of the diode D1 and the diode D2 are connected at a first contact node Nd1, and the anode of the diode D1 is connected to the second electrode C1$p$2 of the first capacitor C1, and the anode of the diode D2 is connected to the second electrode C2$p$2 of the second capacitor C2.

Further, the anodes of the diode D3 and the diode D4 are connected at a second contact node Nd2, the cathode of the diode D3 is connected to the second electrode C1$p$2 of the first capacitor C1, and the cathode of the diode D4 is connected to the second electrode C2$p$2 of the second capacitor C2. The second contact node Nd2 is connected to the ground. The configuration of the rectifying circuit 31 is not limited to the configuration of FIG. 2.

The smoothing circuit 32 is connected to the rectifying circuit 31 through the voltage line L1, and smoothes the rectified AC voltage, thereby generating a line voltage VL1. In the present illustrative embodiment, the smoothing circuit 32 includes the smoothing/storage capacitor (one example of a storage circuit) C3 and a zener diode ZD1. In the present illustrative embodiment, the zener voltage of the zener diode ZD1 is set to, for example, 6.2 V. As a result, the charged voltage VCH of the smoothing/storage capacitor C3, that is, the voltage VL1 of the power supply line L1 is set to 6.2 V.

The smoothing/storage capacitor C3 is electrically connected to the output terminal (a second output terminal) OUT2 of +5 V of the switching power supply 20 through a diode D5. Further, the smoothing/storage capacitor C3 is electrically connected to the output terminal (a first output terminal) OUT1 of +24 V of the switching power supply 20 through a diode D6. Therefore, sometimes, for example, immediately after activation of the switching power supply 20, it becomes possible to charge the smoothing/storage capacitor C3 by the DC 5 V and the DC 24 V of the switching power supply 20.

The diodes D5, D6 are for preventing a backward flow from the smoothing/storage capacitor C3 toward the DC-to-DC converter 27. Further, the zener diode ZD1 suppresses the power supply line voltage VL1 from rising in a case where the AC voltage Vac of the AC power supply AC rises.

Incidentally, according to setting of the voltage value VL1 of a voltage line L1, for example, in a case where the voltage value VL1 is set to 5.1 V, connection of the smoothing/storage capacitor C3 to the output terminal (the first output terminal) OUT1 of +24 V of the switching power supply 20 may be omitted. In this case, the zener voltage of a zener diode ZD1 is set to, for example, 5.1 V.

4. Relay Control Process

Figure 3:
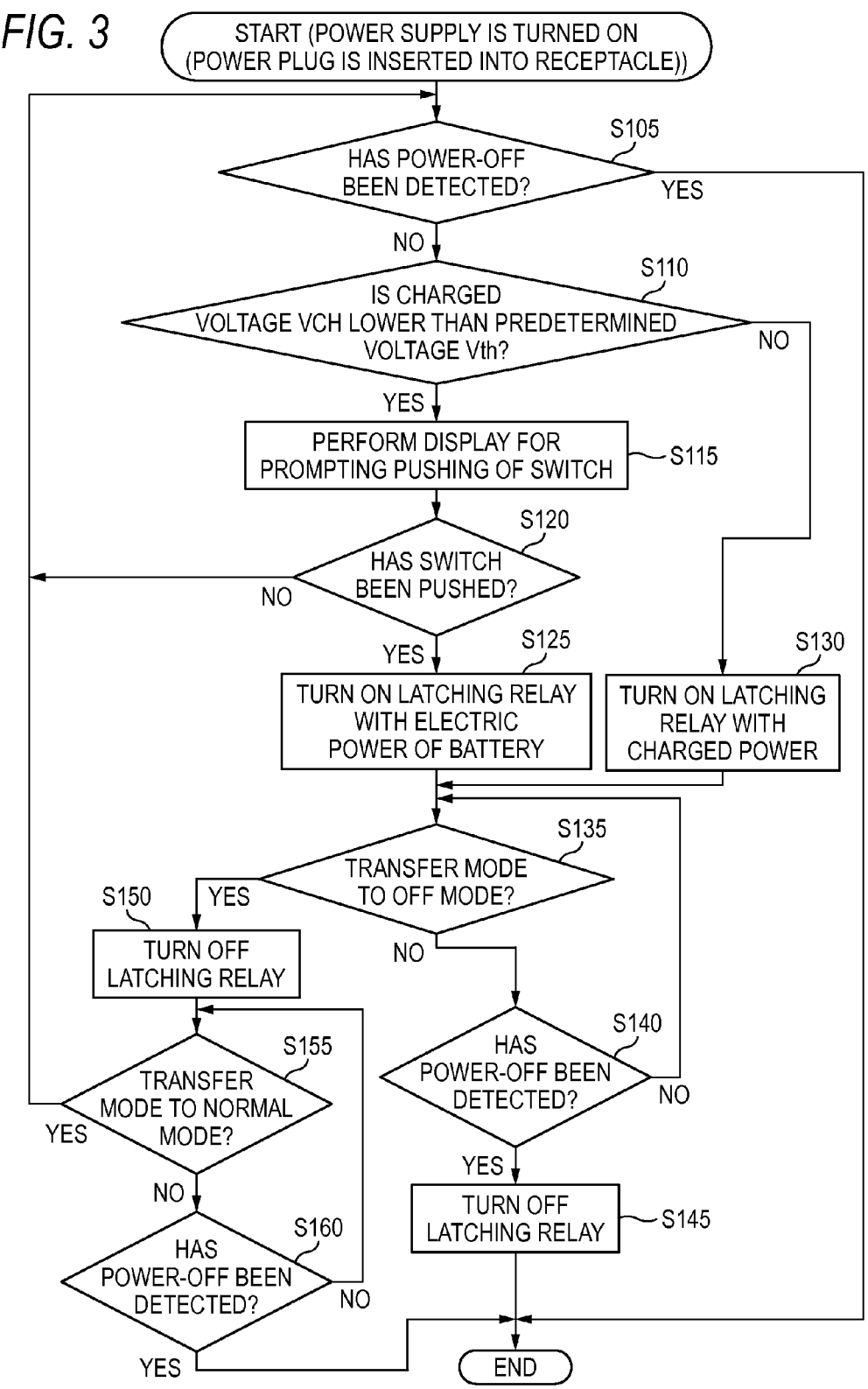
FIG. 3 is a flow chart schematically illustrating a relay control process according to the first illustrative embodiment.

Subsequently, the process of controlling the relay 40 will be described with reference to FIGS. 3 and 4. For example, when the power plug 5 of the printer 1 is inserted into a receptacle, whereby the power supply is turned on (corresponding to a timing t0 of FIG. 4), the relay control process is performed by the mode control IC 52 according to a predetermined program. Incidentally, in the present illustrative embodiment, a case where the normal mode has been set as an operation mode during power-on of the printer 1 will be described. Also, it is assumed that the relay 40 is in an ON state during shipment of the printer 1. Incidentally, the power supply of the printer 1 is not turned on or off only by plugging the power plug 5 in a receptacle or pulling out the power plug 5 from the receptacle, and may be turned on or off by the power switch 4$a$.

In STEP S105, the mode control IC 52 determines whether the power supply of the printer 1 has been turned off by pulling out the power plug 5 from the receptacle, or by a blackout or the like, and power-off of the printer 1 has been detected. Incidentally, in FIG. 4, a case where momentary interruption of the power supply occurs at a time t6, and a case where the power supply is turned off at a time t9 are shown. The mode control IC 52 performs determination on power-off, for example, on the basis of the charged voltage VCH input to the port P3. When the power supply is turned off, the means for charging the smoothing/storage capacitor C3 disappears, and thus the charged voltage VCH drops. Therefore, it is possible to detect power-off on the basis of a drop of the charged voltage VCH. That is, in the present illustrative embodiment, detection on power-off of the printer 1 is performed by monitoring the charged voltage VCH. Incidentally, detection on power-off of the printer 1 is not limited thereto, and may be performed, for example, by detection on a zero-cross point of the AC power supply AC (to be described below).

In a case of determining that power-off has been detected ("YES" in STEP S105), the mode control IC 52 finishes the relay control process. On the other hand, in a case where it is not determined that power-off has been detected ("NO" in STEP S105), in STEP S110, the mode control IC 52 determines whether the charged voltage VCH of the smoothing/storage capacitor C3 is lower than a predetermined voltage Vth. Here, the predetermined value Vth for the charged voltage VCH is determined to a value corresponding to the charged power (amount of charge) of the smoothing/storage capacitor C3 capable of ensuring driving of the relay 40, in advance, by experiments or the like. In the present illustrative embodiment, the predetermined value Vth is set to, for example, 4 V.

In a case of determining that the charged voltage VCH is not lower than the predetermined value Vth, that is, in a case of determining that the charged voltage VCH is equal to or higher than 4 V ("NO" in STEP S110), in STEP S130, the mode control IC 52 uses the charged power of the smoothing/storage capacitor C3 to turn on the relay 40. Specifically, the mode control IC 52 generates the relay control signal RelayM, and outputs the relay control signal RelayM to the relay drive circuit 60. Since the relay 40 is turned on, the switching power supply 20 is activated, and the mode is switched to the normal mode. This case corresponds to times t1 and t7 of FIG. 4.

Here, the time t1 is a time when the charged voltage VCH reaches the predetermined value Vth (4 V) in a case where the smoothing/storage capacitor C3 is gradually charged through a rectifier circuit 31 during power-on. Further, the time t7 is a time when the power supply is restored after temporary power-off attributable to momentary interruption or the like. In a case where the power supply is restored from momentary interruption, a drop of the charged voltage VCH is small, and in FIG. 4, a case where the charged voltage VCH is equal to or larger than 4 V is illustrated.

On the other hand, in a case where it is determined in STEP S110 that the charged voltage VCH is lower than the predetermined value Vth (4 V) ("YES" in STEP S110), in STEP S115, the mode control IC 52 controls the display unit 4b such that the display unit 4b performs display for prompting the user to push the mode setting switch SW1. This case corresponds to a period from the time t0 to the time t1, and a period from a time t3 to a time t4 of FIG. 4. Here, the period from the time t0 to the time t1 is a charging period of the smoothing/storage capacitor C3. Further, the period from the time t3 to the time t4 is a period illustrated on the assumption that electric power more than expected has been consumed due to any cause and the charged voltage VCH has dropped to be lower than the predetermined value Vth.

Next, in STEP S120, the mode control IC 52 determines whether the mode setting switch SW1 has been pushed, on the basis of a signal input to the port P2. In a case of determining that the mode setting switch SW1 has not been pushed ("NO" in STEP S120), the mode control IC 52 returns to the process of STEP S105. On the other hand, in a case of determining that the mode setting switch SW1 has been pushed by the user ("YES" in STEP S120), in STEP S125, the mode control IC 52 uses electric power of the battery Ba to turn on the relay 40. In the case of turning on the relay 40, the mode control IC 52 generates the relay control signal RelayM, and outputs the relay control signal RelayM to the relay drive circuit 60. Since the relay 40 is turned on, the switching power supply 20 is activated, and the mode is switched to the normal mode.

Figure 4:
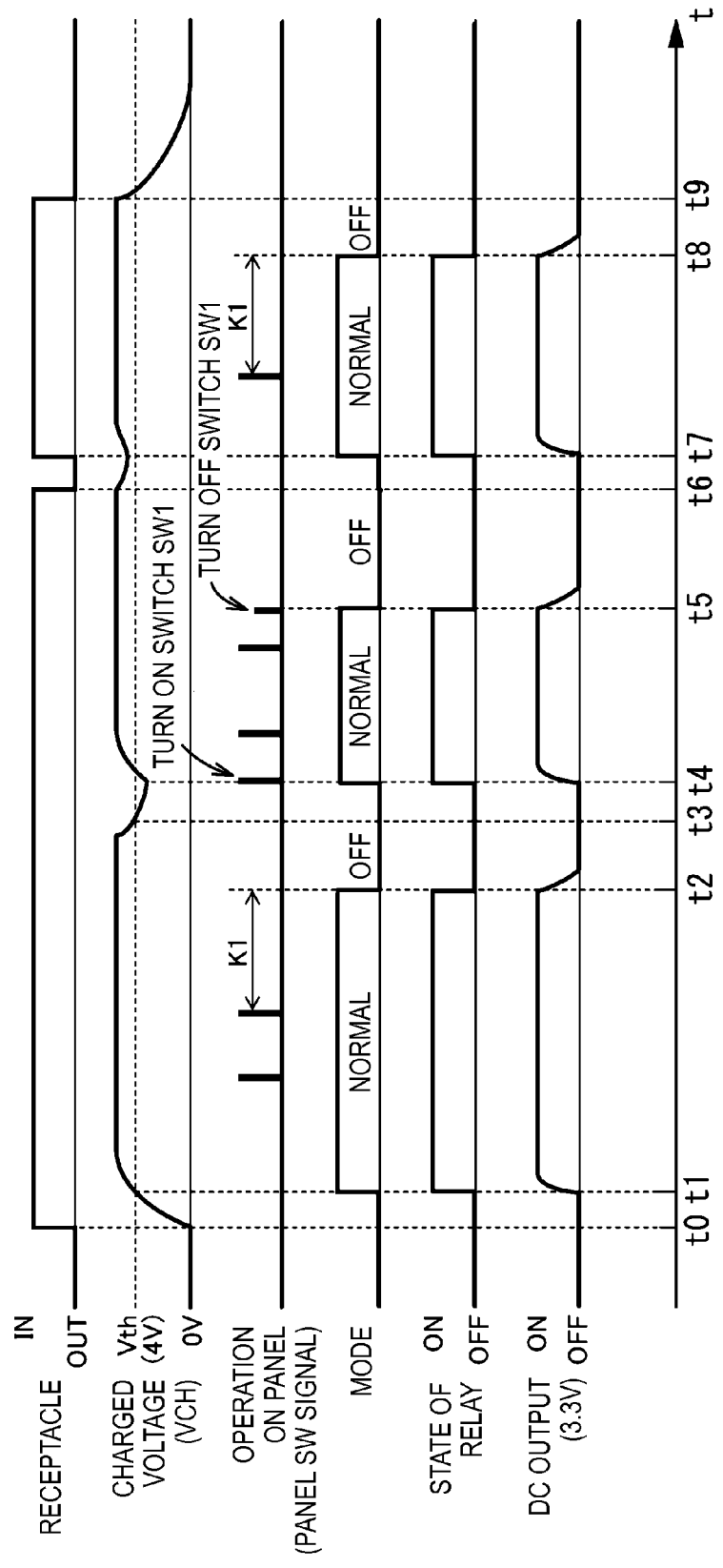
FIG. 4 is a time chart schematically illustrating the relay control process according to the first illustrative embodiment.

This case corresponds to any one time in the period from the time t0 and the time t1, and the time t4 of FIG. 4. In a case where the mode setting switch SW1 is pushed at any one time in a period from the time t0 to the time t1, earlier than the time t1, the normal mode is set, and the switching power supply 20 is activated. That is, since the mode control IC 52 turns on the relay 40 with electric power of the battery Ba during power-on, it is possible to quickly start up the switching power supply during power-on.

As described above, in the present illustrative embodiment, immediately after the power supply of the printer 1 is turned on, since the smoothing/storage capacitor C3 has not been charged sufficiently to drive the relay 40, in order to turn on the relay 40 with electric power of the battery Ba, display to prompt pushing of the mode setting switch SW1 is performed. However, in a case where the user does not push the mode setting switch SW1, the charged voltage VCH of the smoothing/storage capacitor C3 rises, and thus it is possible to turn on the relay 40 with the charged power of the smoothing/storage capacitor C3.

Next, in STEP S135, the mode control IC 52 determines whether to transfer the mode from the normal mode to the OFF mode. The determination on whether to transfer the mode from the normal mode to the OFF mode is performed, for example, by determining whether a predetermined time K1 has elapsed, without reception of print data or issuing of an operation instruction such as a print instruction by the user, after completion of printing according to the print instruction by a user's operation on the panel (a panel SW signal), on the basis of the count value of a timer 55, as shown in FIG. 4. In the normal mode, the panel SW signal shown in FIG. 4 is generated in response to an operation of the user on the operation panel 4. Alternatively, the determination on whether to transfer the mode from the normal mode to the OFF mode may be performed by determining whether the switch SW1 has been turned off by an operation of the user on the operation panel 4, whereby the OFF mode has been selected.

In a case of determining not to transfer the mode to the OFF mode ("NO" in STEP S135), in STEP S140, the mode control IC 52 determines whether power-off of the printer 1 has been detected, similarly in STEP S105. In a case where power-off of the printer 1 has not been detected ("NO" in STEP S140), the mode control IC 52 returns to the process of STEP S135. On the other hand, in a case where power-off of the printer 1 has been detected ("YES" in STEP S140), the mode control IC 52 turns off the relay 40 with electric charge charged in the smoothing/storage capacitor C3, in STEP S145, and finishes this process. In this case, the mode control IC 52 generates the relay control signal RelayB, and outputs the relay control signal RelayB to the relay drive circuit 60. As described above, in the present illustrative embodiment, in a case where power-off of the printer 1 is detected in the normal mode, the relay 40 is turned off, and at this time, necessary electric power is supplied from the smoothing/storage capacitor C3.

On the other hand, in a case where it is determined in STEP S135 that the predetermined time K1 has elapsed as shown at the time t2 and the time t8 of FIG. 4, the mode control IC 52 determines to transfer the mode from the normal mode to the OFF mode ("YES" in STEP S135), and turns off the relay 40 in STEP S150. Further, even in a case where the switch SW1 has been turned off by an operation of the user on the operation panel 4, whereby the OFF mode has been selected as shown at a time t5 of FIG. 4, the mode control IC 52 performs the same process.

In order to transfer the mode to the OFF mode, the mode control IC 52 generates the relay control signal RelayB for disconnecting the switching power supply 20 and the AC power supply AC, and outputs the relay control signal RelayB to the relay drive circuit 60. As a result, the switching power supply 20 and the AC power supply AC are disconnected, and the operation of the switching power supply 20 stops. Thus, in the OFF mode, electric power is supplied to the relay drive circuit 60 and the mode control IC 52 only by the low-capacity power supply circuit 30.

Incidentally, when the mode transitions from the normal mode to the OFF mode, in the interval, a sleep mode period which is a power saving period when a larger amount of electric power is consumed as compared to the OFF mode may be provided. At this time, in a case where the mode transitions to the OFF mode by time measurement, the mode may transition to the OFF mode after measurement of the sleep mode period.

Next, in STEP S155, the mode control IC 52 determines whether to transfer the mode to the normal mode. This determination is performed, for example, by determining whether a user's operation on the panel (a panel SW signal) for performing printing, for example, has been received. In a case of determining to transfer the mode to the normal mode ("YES" in STEP S155), the mode control IC 52 returns to the process of STEP S105. This case corresponds to the time t4 of FIG. 4, and immediately after the time t4, in a case where the mode setting switch SW1 is pushed by the user, the relay 40 is turned on with electric power of the battery Ba in STEP S125. As a result, the mode transitions to the normal mode. Incidentally, in a case where the charged voltage VCH is not lower than the predetermined value Vth (4 V) at the time t4 ("NO" in STEP S110), as described above, in STEP S130, the relay 40 is turned on with the charged power of the smoothing/storage capacitor C3.

On the other hand, in a case of determining not to transfer the mode to the normal mode ("NO" in STEP S155), in STEP S160, the mode control IC 52 determines whether the power supply of the printer 1 is in the OFF state, for example, due to pulling out of the power plug 5 from the receptacle. Similarly to STEP S 105, this determination is performed, for example, on the basis of monitoring of the charged voltage VCH.

In a case of determining that the power supply of the printer 1 is not in the OFF state ("NO" in STEP S160), the mode control IC 52 returns to the process of STEP S155. On the other hand, in a case of determining that the power supply of the printer 1 is in the OFF state ("YES" in STEP S160), the mode control IC 52 finishes this control process. This case corresponds to the time t9 of FIG. 4.

5. Advantages of First Illustrative Embodiment

As described above, in the OFF mode, the switching power supply 20 and the AC power supply AC are disconnected by the relay 40. Therefore, it is possible to suppress a current from leaking in the switching power supply 20, especially, the smoothing capacitor of the rectifying/smoothing circuit 21, and thus to reduce power consumption. Incidentally, although electric power is always supplied from the AC power supply AC to the low-capacity power supply circuit 30, that electric power is considerably less as compared to power consumption of the rectifying/smoothing circuit 21 and the control IC 22 of the switching power supply 20. Therefore, the power consumption of the low-capacity power supply circuit 30 does not influence on reduction in the power consumption of the power supply system 100.

Further, the power supply system 100 has the battery Ba. Therefore, in a case where the relay 40 is turned off during power-off of the printer 1, although the charged voltage VCH of the smoothing/storage capacitor C3 has dropped so as to be unable to drive the relay 40, it is possible to always turn on the relay 40 with electric power of the battery Ba during power-off of the printer 1.

Further, during power-on of the printer 1, for example, when the power plug 5 is plugged in a power receptacle, the relay 40 is in an ON state, and thus, even in a case where electric power from the AC power supply AC is not supplied, the battery Ba is connected to the mode control IC 52 and the relay drive circuit 60 by the mode setting switch SW1, whereby it is possible to drive the relay 40, thereby turning on the relay 40. That is, even though the power plug 5 is pulled out from the power receptacle in a state where the switching power supply 20 and the AC power supply AC is in the disconnection state, whereby the power supply of the printer 1 is turned off, in a case where the power supply is turned on in next time, it is possible to connect the switching power supply 20 and the AC power supply AC.

Further, in the present illustrative embodiment, the mode setting switch SW1 further functions as a switch for switching the connection state of the battery Ba with the mode control IC 52 and the relay drive circuit 60. In other words, the switch SW1 serves both as a switch for connection of battery and the mode setting switch. Therefore, it is possible to use one switch SW1 not only as a switch for setting a mode but also as a switch for connection of the battery.

Further, the charged voltage VCH is set to 6.2 V, and the battery voltage VBa is set to 5 V. That is, the charged voltage VCH of the smoothing/storage capacitor C3 in the normal mode is set to be higher than the battery voltage VBa by a predetermined voltage, here, by 1.2 V. Therefore, even if the mode setting switch SW1 is pushed in the normal mode to switch the mode to the OFF mode, a current does not flow from the battery Ba into the power supply line L1 through diodes D9 and D10. That is, it is possible to prevent a current from unnecessarily flowing from the battery Ba, and thus it becomes possible to reduce the capacity of the battery Ba. Therefore, it becomes possible to reduce the size and cost of the battery Ba.

(Second Illustrative Embodiment)

Subsequently, a second illustrative embodiment will be described with reference to FIGS. 5 and 6. The second illustrative embodiment is different from the first illustrative embodiment in control on a timing to turn on the relay 40. That is, in the first illustrative embodiment, with respect to the timing to turn on the relay 40, a condition has not been particularly set. However, in the second illustrative embodiment, the relay 40 is switched from the OFF state to the ON state in response to a zero-cross point of the AC power supply AC.

Figure 5:
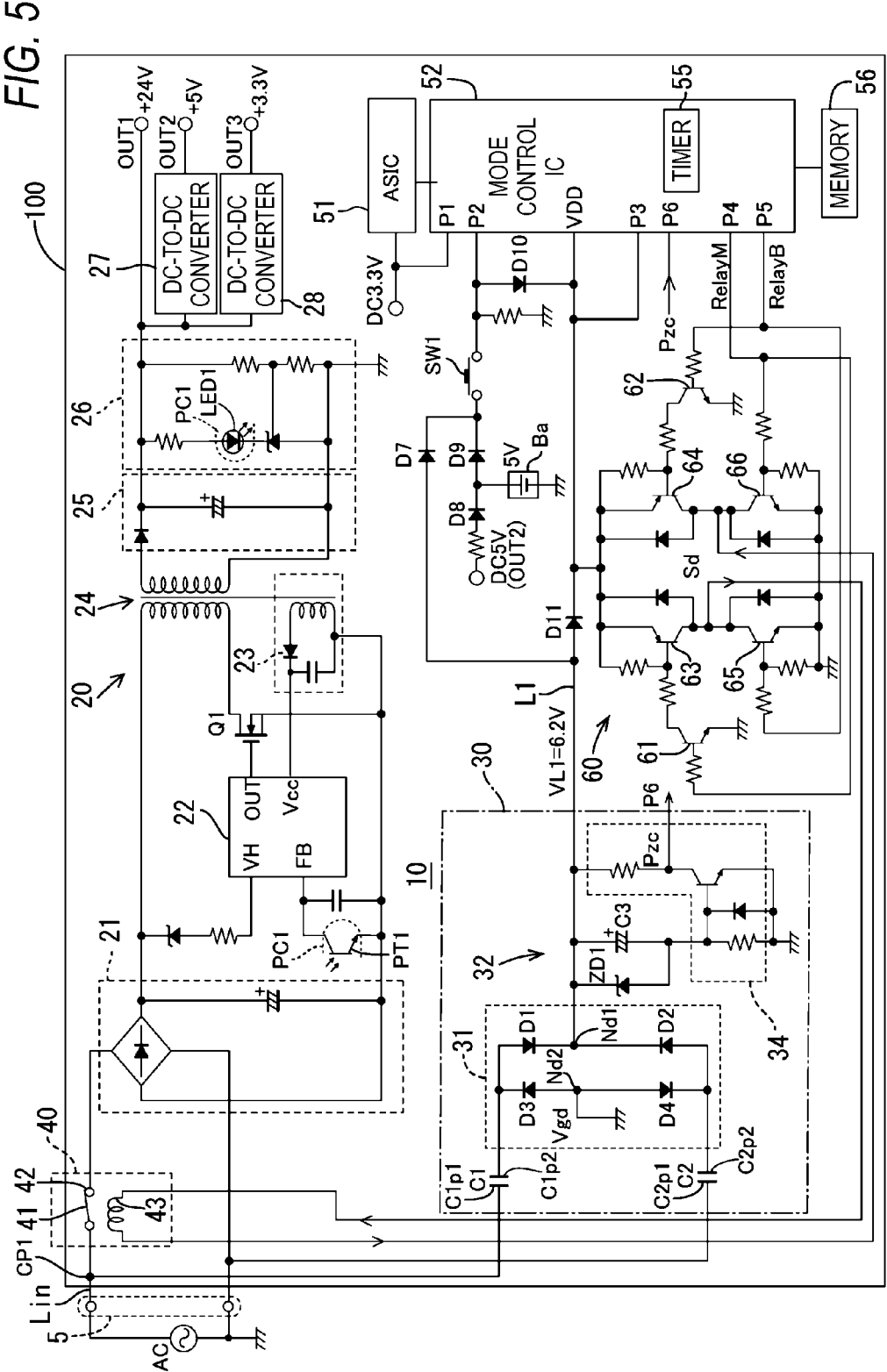
FIG. 5 is a block diagram illustrating a schematic configuration of a power supply system according to a second illustrative embodiment.
Figure 6B:
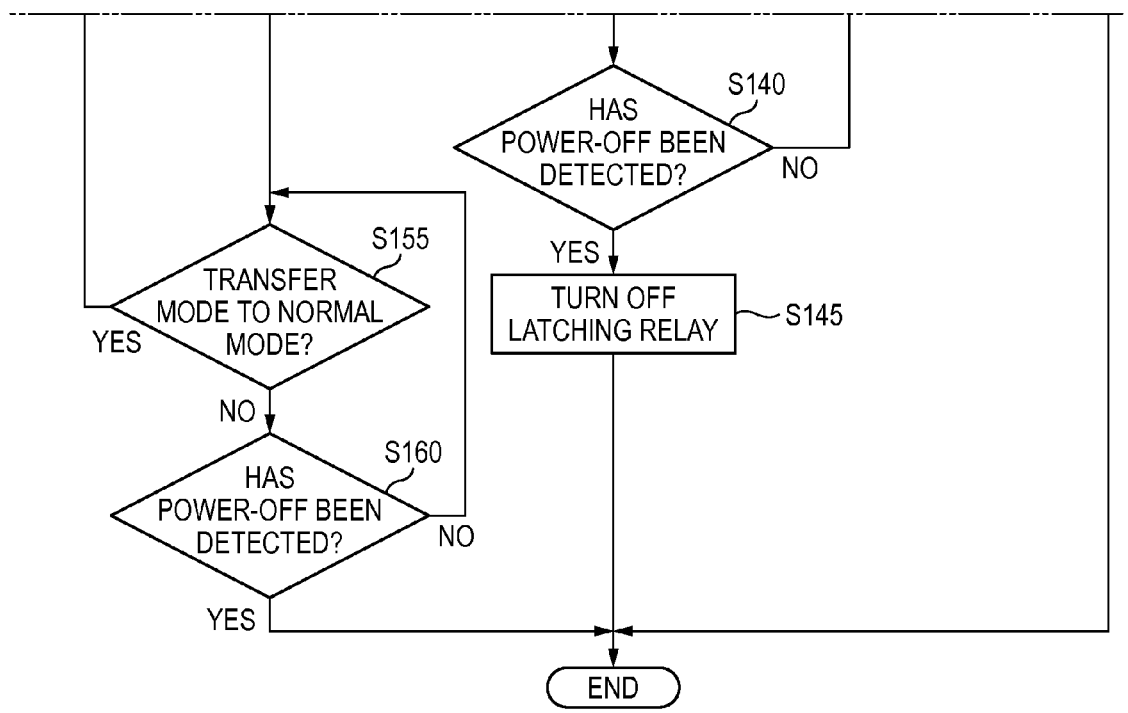

For this reason, the power supply system 100 of the second illustrative embodiment includes a zero-cross detection signal generating circuit 34 (an example of a signal generating circuit) for generating a zero-cross detection signal Pzc corresponding to a zero-cross point of the AC power supply AC, for example, as shown in FIG. 5. The zero-cross detection signal generating circuit 34 is connected to the smoothing/storage capacitor C3, and generates a pulse-like zero-cross detection signal Pzc corresponding to a zero-cross point of the AC power supply AC in response to a current flowing in the smoothing/storage capacitor C3 in response to the AC power supply AC. The zero-cross detection signal Pzc is input to a port P6 of the mode control IC 52. The mode control IC 52 generates the relay control signal RelayM for turning on the relay 40, in response to the zero-cross detection signal Pzc.

More specifically, the mode control IC 52 detects a zero-cross point on the basis of the zero-cross detection signal Pzc. Thereafter, in order to turn on the relay 40, the mode control IC 52 generates the relay control signal RelayM at a predetermined timing set in view of the operation time of the relay 40, on the basis of the detection of the zero-cross point. The relay drive circuit 60 drives the relay 40, in response to the relay control signal RelayM, in other words, in response to the zero-cross detection signal Pzc.

Further, in a case where supply of electric power from the AC power supply AC to the power supply system 100 is interrupted, any zero-cross point does not occur, and thus any zero-cross point is not detected. Therefore, the mode control IC 52 detects interruption of supply of electric power, that is, power-off. Incidentally, in the second illustrative embodiment, since the AC power supply AC and the switching power supply 20 are not in the connection state during power-on of the printer 1, as shown in FIG. 5, the smoothing/storage capacitor C3 is not connected to the output terminal (the second output terminal) OUT2 of +5 V of the switching power supply 20.

1. Relay Control Process

Subsequently, a process of controlling the relay 40 according to the second illustrative embodiment will be described with reference to FIG. 6. Incidentally, processes identical to those of the first illustrative embodiment are denoted by the same process reference symbols, and will not be described. Similarly in the first illustrative embodiment, the relay control process according to the second illustrative embodiment is performed according to a predetermined protocol by the mode control IC 52, for example, when the power plug 5 of the printer 1 is inserted into a receptacle and the power supply is turned on.

That is, in the second illustrative embodiment, in a case where it is determined in STEP S110 that the charged voltage VCH is not lower than the predetermined value Vth ("NO" in STEP S110), in STEP S205, the mode control IC 52 detects a zero-cross point on the basis of the zero-cross detection signal Pzc, and sets a relay turn-on timing to turn on the relay 40, on the basis of the zero-cross point.

Specifically, the relay turn-on timing is a timing for the relay drive circuit 60 to start excitation of the relay coil 43 in response to the relay control signal RelayM. In general, the operation of the relay 40 requires a predetermined time, and in this time, the waveform of the AC power supply AC changes. For this reason, in view of the operation time of the movable piece 41 according to excitation of the relay coil 43, the relay turn-on timing is set to a timing earlier than the timing of a predetermined zero-cross point by a predetermined time. This predetermined time is determined in advance by experiences or the like such that a surge current during power-on becomes a predetermined value or less, and is stored in the ROM or the like of the memory 56.

Next, in STEP S210, the mode control IC 52 determines whether it has come the relay turn-on timing, for example, on the basis of the measured value of the timer 55 from the timing of the predetermined zero-cross point earlier than the relay turn-on timing. In a case where it has not come the relay turn-on timing ("NO" in STEP S210), the mode control IC 52 waits. In a case where it has come the relay turn-on timing ("YES" in STEP S210), in STEP S130, the mode control IC 52 turns on the relay 40 with the charged power of the smoothing/storage capacitor C3.

Incidentally, here, an example in which the mode setting switch SW1 further functions as the switch for connection of the battery has been described. However, the present invention is not limited thereto. The switch for connection of the battery may be configured as a semiconductor switch which is turned on or off by control of the mode control IC 52. In this case, since it is possible to turn on the semiconductor switch at a predetermined timing by the mode control IC 52, even on the occasion of driving the relay 40 with electric power of the battery Ba, the processes of STEPS S205 and S210 may be performed. That is, the mode control IC 52 may set the turn-on timing of the relay 40 on the basis of detection on a zero-cross point of the AC power supply AC, and turn on the relay 40 with electric power of the battery Ba at the turn-on timing. Therefore, even when the AC power supply AC is connected to the switching power supply 20 by electric power of the battery Ba, it is possible to suppress an inrush current from flowing in the switching power supply 20.

2. Advantages of Second Illustrative Embodiment

In the vicinity of a zero-cross point of the AC power AC, an AC voltage or an AC current is very close to zero. For this reason, in the present illustrative embodiment, in response to a zero-cross point, the relay 40 is turned on with the charged power of the smoothing/storage capacitor C3, or the relay 40 is turned on with electric power of battery Ba by pushing of the mode setting switch SW1. Therefore, it is possible to suppress an inrush current from flowing in the switching power supply 20 when the AC power AC is connected to the switching power supply 20. At that time, since the relay control signal RelayM is generated in view of the operation time of the relay 40, it is possible to more surely suppress an inrush current.

(Third Illustrative Embodiment)

Subsequently, a process of controlling the relay 40 according to a third illustrative embodiment will be described with reference to FIGS. 7 and 8. The relay control process of the third illustrative embodiment is a process of suppressing an inrush current flowing in the switching power supply 20 by a method different from that of the second illustrative embodiment when the relay 40 is turned on, in the power supply system having the battery Ba for driving the relay.

Figure 7:
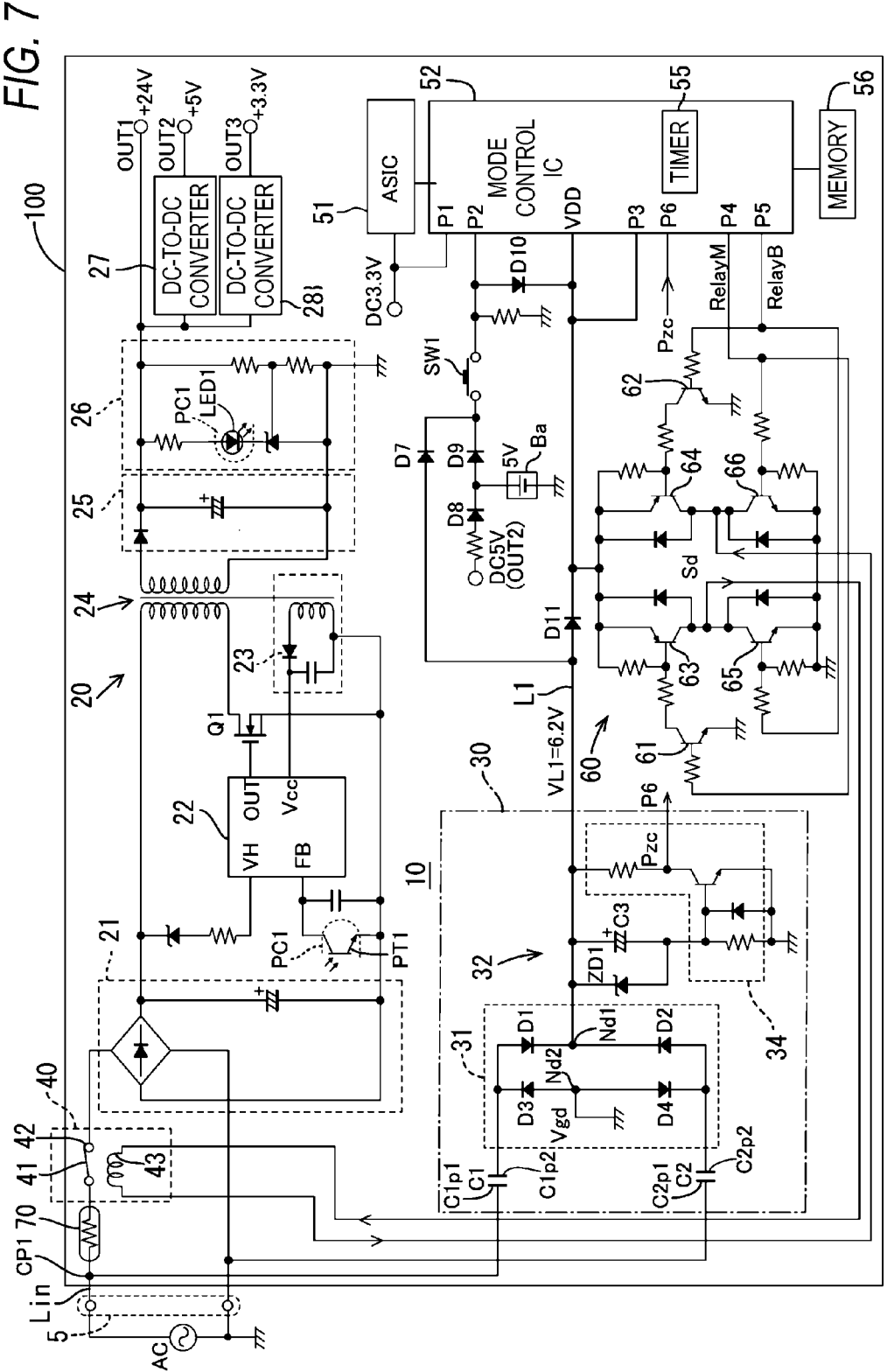
FIG. 7 is a block diagram illustrating a schematic configuration of a power supply system according to a third illustrative embodiment.
Figure 8B:
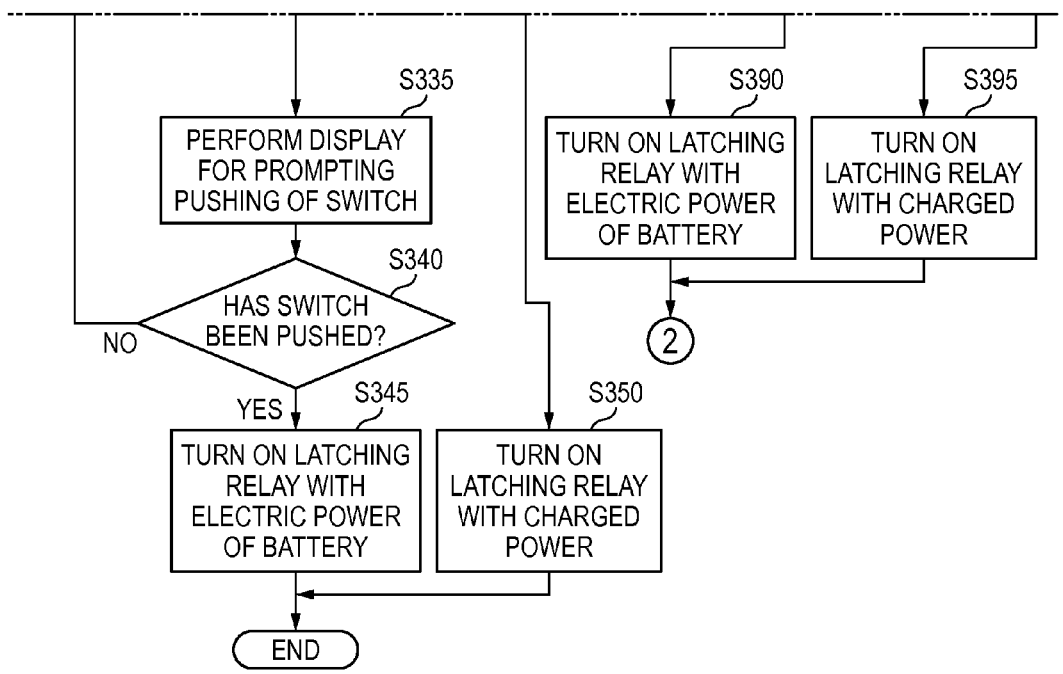

That is, in the third illustrative embodiment, in order to suppress an inrush current, as shown in FIG. 7, on the AC input line Lin, at a preceding stage of the relay 40, specifically, on the AC input line Lin, between a contact point CP1 of the low-capacity power supply circuit 30 and the relay 40, a thermistor 70 is provided. Further, the temperature of the thermistor 70 during power-on is set to be substantially equal to room temperature. That is, the relay control process of the third illustrative embodiment shown in FIG. 8 is started during cold start.

Similarly to the first and second illustrative embodiments, the relay control process of the third illustrative embodiment is performed according to a predetermined program by the mode control IC 52, for example, when the power plug 5 of the printer 1 is inserted into a receptacle, and the power supply of the printer 1 is turned on. Incidentally, unlike the first and second illustrative embodiments, in the third illustrative embodiment, it is assumed that during power-on, the relay 40 is in the ON state. Further, processes identical to those of the first and second illustrative embodiments are denoted by the step reference symbols of the first and second illustrative embodiments, and will not be described in detail.

1. Relay Control Process

Similarly in the first and second illustrative embodiments, in the relay control process, first, in STEP S305, the mode control IC 52 determines whether the power supply of the printer 1 has been turned off due to pulling out of the power plug 5 from the receptacle, or due to a blackout or the like, and power-off of the printer 1 has been detected. This determination is based, for example, on monitoring of the charged voltage VCH. Alternatively, a zero-cross point of the AC power supply AC may be detected on the basis of a zero-cross detection signal Pzc of the zero-cross detection signal generating circuit 34, and the determination of STEP S305 may be performed on the basis of the zero-cross point.

In a case of determining that power-off has been detected ("YES" in STEP S305), the mode control IC 52 proceeds to processes of STEP S360 and the subsequent STEPS (to be described below). On the other hand, in a case where it is not determined that power-off has been detected ("NO" in STEP S305), in STEP S310, the mode control IC 52 determines whether to transfer the mode from the normal mode to the OFF mode by the same method as that of STEP S135 of the first or second illustrative embodiment.

In a case of determining not to transfer the mode to the OFF mode ("NO" in STEP S310), the mode control IC 52 returns to STEP S305. On the other hand, in a case of determining to transfer the mode from the normal mode to the OFF mode ("YES" in STEP S310), in STEP S315, the mode control IC 52 turns off the relay 40.

Next, in STEP S320, the mode control IC 52 determines whether to transfer the mode to the normal mode, by the same method as that of STEP S155. In a case of determining to transfer the mode to the normal mode ("YES" in STEP S320), the mode control IC 52 proceeds to the process of STEP S375 (to be described below). On the other hand, in a case of determining not to transfer the mode to the normal mode ("NO" in STEP S320), in STEP S325, the mode control IC 52 determines whether power-off of the printer 1 has been detected, again.

In a case of determining that power-off of the printer 1 has not been detected ("NO" in STEP S325), the mode control IC 52 returns to the process of STEP S320. On the other hand, in a case of determining that power-off of the printer 1 has been detected ("YES" in STEP S320), in STEP S330, the mode control IC 52 determines whether the charged voltage VCH of the smoothing/storage capacitor C3 is lower than a predetermined value Vth, similarly in STEP S110. Here, the predetermined value Vth is set to, for example, 4 V, similarly in the first and second illustrative embodiments.

In a case of determining that the charged voltage VCH is not lower than the predetermined value Vth, that is, in a case of determining that the charged voltage VCH is equal to or higher than 4 V ("NO" in STEP S330), similarly in the determination of STEP S110, the mode control IC 52 turns on the relay 40 with the charged power of the smoothing/storage capacitor C3 in STEP S350, and finishes this control process. That is, in a case where the power supply of the printer 1 is turned off during the OFF mode, the relay 40 is turned on with the charged power.

On the other hand, in a case where it is determined in STEP S330 that the charged voltage VCH is lower than the predetermined value Vth (4 V) ("YES" in STEP S330), similarly in the determination in STEP S110, in STEP S335, the mode control IC 52 controls the display unit 4b such that the display unit 4b performs display to prompt the user to push the mode setting switch SW1.

Next, in STEP S340, the mode control IC 52 determines whether the mode setting switch SW1 has been pushed, on the basis of a signal input to the port P2. In a case of determining that the mode setting switch SW1 has not been pushed ("NO" in STEP S340), the mode control IC 52 returns to the process of STEP S330. On the other hand, in a case of determining that the mode setting switch SW1 has been pushed by the user ("YES" in STEP S330), similarly in the determination in STEP S120, the mode control IC 52 turns on the relay 40 with electric power of the battery Ba in STEP S345, and finishes this control process. That is, in a case where the power supply of the printer 1 is turned off during the OFF mode, the relay 40 is turned on with electric power of the battery Ba.

On the other hand, in a case where it is determined in STEP S305 that power-off has been detected ("YES" in step305), in STEP S360, the mode control IC 52 turns off the relay 40 immediately, that is, at the same as the detection of the power-off Incidentally, in this case, in order to turn off the relay 40 at the same time as the detection of the power-off, electric power of the battery Ba may be used. Further, here, in the case of determining that power-off has been detected, the relay 40 may not be turned off immediately, that is, at the same time as the detection of the power-off. For example, a timing to turn off the relay 40 may be determined in response to the value of the charged voltage VCH. Next, in STEP S365, the mode control IC 52 determines whether the charged voltage VCH of the smoothing/storage capacitor C3 is lower than the a predetermined voltage VCD (an example of a predetermined voltage). Here, the predetermined voltage VCD is determined to the value of the charged voltage VCH of the smoothing/storage capacitor C3 capable of surely detecting cooling of the thermistor 70 to a predetermined temperature, in advance, by experiences or the like. In the present illustrative embodiment, the predetermined voltage VCD is set to, for example, 4.5 V. In the present illustrative embodiment, since the charged voltage VCH ensuring driving of the relay 40 is set to 4.0 V (Vth), it is possible to drive the relay 40 by the charged voltage VCH of 4.5 V which is the predetermined voltage VCD.

That is, in the present illustrative embodiment, a thermistor cooling period from the time of power-off is set to a period in which the charged voltage VCH drops to the predetermined voltage VCD (4.5 V) capable of driving the relay 40. During power-off, in general, with elapse of time from the time of power-off, the charged voltage VCH gradually decreases on the basis of a discharging characteristic according to a circuit time constant. Therefore, it is possible to estimate elapsed time from the time of power-off, that is, the thermistor cooling period in the present illustrative embodiment, on the basis of the value of the charged voltage VCH.

In a case of determining that the charged voltage VCH is lower than the predetermined voltage VCD (4.5 V) ("YES" in STEP S365), the mode control IC 52 determines that the thermistor 70 has been cooled to the predetermined temperature, and proceeds to STEP S330. On the other hand in a case of determining that the charged voltage VCH is not lower than the predetermined voltage VCD (4.5 V) ("NO" in STEP S365), in STEP S370, the mode control IC 52 determines whether a predetermined time K2 (an example of a predetermined time) has elapsed from the time of the power-off. Here, the predetermined time K2 is set to a time in which the charged voltage VCH decreases to the predetermined voltage VCD according to the circuit time constant during power-off, that is, a time longer than the thermistor cooling period. For example, the predetermined time K2 is set to a time which is 1.5 times the thermistor cooling period.

In a case of determining that the predetermined time K2 has not elapsed ("NO" in STEP S370), the mode control IC 52 returns to STEP S365. On the other hand, in a case of determining that the predetermined time K2 has elapsed ("YES" in STEP S370), the mode control IC 52 determines that the reason why the charged voltage VCH has not decreased to the predetermined voltage VCD although the predetermined time K2 has elapsed is that the power supply has been in the ON state.

That is, it is possible to assume that the reason why the charged voltage VCH has not decreased to the predetermined voltage VCD by discharging according to the circuit time constant although the predetermined time K2 has elapsed is that the power supply has been in the ON state. Next, in STEP S375, similarly in STEP S330, the mode control IC 52 determines whether the charged voltage VCH of the smoothing/storage capacitor C3 is lower than the predetermined value Vth (4 V).

In a case of determining that the charged voltage VCH is not lower than the predetermined value Vth, that is, in a case of determining that the charged voltage VCH is equal to or higher than 4 V ("NO" in STEP S375), similarly in the determination of STEP S110, the mode control IC 52 turns on the relay 40 with the charged power of the smoothing/storage capacitor C3 in STEP S395, and returns to STEP S305. Since the relay 40 is turned on, the switching power supply 20 is activated, and the mode is switched to the normal mode.

On the other hand, in a case of determining that the charged voltage VCH is lower than the predetermined value Vth (4 V) ("YES" in STEP S375), similarly in the determination in STEP S110, in STEP S380, the mode control IC 52 controls the display unit 4b such that the display unit 4b performs display to prompt the user to push the mode setting switch SW1.

Next, in STEP S385, the mode control IC 52 determines whether the mode setting switch SW1 has been pushed, on the basis of a signal input to the port P2. In a case of determining that the mode setting switch SW1 has not been pushed ("NO" in STEP S385), the mode control IC 52 returns to the process of STEP S375. On the other hand, in a case of determining that the mode setting switch SW1 has been pushed by the user ("YES" in STEP S385), similarly in the determination in STEP S120, the mode control IC 52 turns on the relay 40 with electric power of the battery Ba in STEP S390, and returns to STEP S305. Since the relay 40 is turned on, the switching power supply 20 is activated, and the mode is switched to the normal mode.

Incidentally, instead of the determining process of STEP S365, determination on whether a predetermined thermistor cooling period has elapsed may be performed, and instead of the determining process of STEP S370, determination on whether power-on has been detected may be performed. For example, a zero-cross point of the AC power supply AC may be detected on the basis of a zero-cross detection signal Pzc of the zero-cross detection signal generating circuit 34, and the determination on power-on may be performed on the basis of the zero-cross point. That is, when the power supply of the printer 1 is turned on, a zero-cross point is detected.

2. Advantages of Third Illustrative Embodiment

In the present illustrative embodiment, on the AC input line Lin, at a preceding stage of the relay 40, the thermistor 70 is provided. With respect to resistance, the thermistor 70 has a negative temperature characteristic in which as temperature rises, resistance decreases. Therefore, on the occasion of driving the relay 40 with electric power of the battery Ba by pushing of the mode setting switch SW1, thereby connecting the AC power AC to the switching power supply 20, in a case where the temperature of the thermistor 70 is low during power-on of cold start, for example, since the resistance of the thermistor 70 increases, it is possible to suppress an inrush current from flowing in the switching power supply 20, especially, flowing in the smoothing capacitor of the rectifying/smoothing circuit 21.

Further, in a case where interruption of supply of the AC power supply AC, that is, power-off has been detected, on the occasion of driving the relay 40 by the battery Ba or the smoothing/storage capacitor C3, after the thermistor cooling period of the predetermined time "YES" in STEPS S365 or S370), the relay 40 is driven, whereby the AC power supply AC and the switching power supply 20 are connected. Therefore, even in a case where ON/OFF (existence/nonexistence) of supply of the AC power AC is continuously performed, it is possible to reduce an inrush current flowing into the switching power supply 20.

Further, in a case where the predetermined time K2 longer than the thermistor cooling period elapses before the charged voltage VCH drops to be lower than the predetermined voltage VCD, the mode control IC 52 determines that there is supply of the AC power supply AC ("YES" in STEP S370), and drives the relay 40 such that the switching power supply 20 and the AC power supply AC are connected. Therefore, even in a case where the power supply has been turned off during the normal mode ("YES" in STEP S305), and then after a short time, the power supply has been turned on ("YES" in STEP S370), since the predetermined time K2 has elapsed and the thermistor 70 has been cooled to the predetermined temperature, it is possible to surely reduce an inrush current.

Further, in a case where interruption of supply of the AC power supply AC has been detected during the normal mode in which the switching power supply 20 and the AC power supply AC has been in the connection state ("YES" in STEP S305), in STEP S360, the mode control IC 52 immediately drives the relay 40, thereby connecting the switching power supply 20 and the AC power supply AC. Therefore, it is possible to set the thermistor cooling period as long as possible, and even in a case where the power supply system is powered off during the normal mode, it is possible to surely reduce an inrush current in a case where the power supply is turned on after the thermistor cooling period.

Further, the thermistor cooling period is set to a period in which the charged voltage VCH drops to the predetermined voltage VCD capable of driving the relay 40. In this case, on the occasion of turning on the relay 40, it is possible to drive the relay 40 by electric power of the smoothing/storage capacitor C3, instead of electric power of the battery Ba (refer to STEP S390).

Incidentally, at that time, a case where interruption of supply of the AC power supply AC (power-off) has been detected during the OFF mode (the power saving mode) in which the switching power supply 20 and the AC power supply AC has been in the disconnection state, and a case where interruption of supply of the AC power supply AC has been detected during the normal mode in which the switching power supply 20 and the AC power supply AC has been in the connection state may be different from each other in the predetermined voltage VCD, that is, the thermistor cooling period. In this case, a case where the power supply has been turned off during the OFF mode, and a case where the power supply has been turned off during the normal mode are different from in the thermistor temperature. That is, the thermistor temperature in the case where the power supply has been turned off during the normal mode is higher than that in the case where the power supply has been turned off during the OFF mode. Therefore, the predetermined voltage VCD, that is, the thermistor cooling period can be set to different values for those cases, whereby it is possible to set a thermistor cooling period corresponding to each case. For example, the predetermined voltage VCD in the case where the power supply has been turned off during the normal mode may be set to be lower than that in the case where the power supply has been turned off during the OFF mode, or the thermistor cooling period in the case where the power supply has been turned off during the normal mode may be set to be longer than that in the case where the power supply has been turned off during the OFF mode <Modifications to Illustrative Embodiments>

The present invention is not limited to the illustrative embodiments described with reference to the drawings, but, for example, the following illustrative embodiments are included in the technical scope of the present invention.

(1) In the above-described each illustrative embodiment, an example in which the mode setting switch SW1 for setting the power saving mode or the normal mode further functions as the switch for connection of the battery (an example of a switch) for switching the connection state of the battery Ba with the mode control IC 52 and the relay drive circuit 60 has been described. However, the present invention is not limited thereto. Separately from the mode setting switch SW1, a switch for connection of the battery may be provided. In this case, the switch for connection of the battery is not limited to a switch depending on user's operation, and may be a semiconductor switch which is turned on or off by control of the mode control IC 52. In this case, the relay 40 can be driven by electric power of the battery Ba, not by an operation of the user on the switch.

(2) In the above-described each illustrative embodiment, an example in which determination (STEP S110, S330, or S375) on whether to use electric power of the battery Ba or to use charged power of the smoothing/storage capacitor C3 to turn on the relay 40 is performed has been described. However, the present invention is not limited thereto. Even on the occasion of turning off the relay 40, that determination may be performed, and a process (STEP S115 or S 120, or the like) according to the determination result may be performed. In this case, even in a case where the charged voltage VCH of the smoothing/storage capacitor C3 is lower than the predetermined value Vth on the occasion of turning off the relay 40, it is possible to turn off the relay 40 with electric power of the battery Ba.

(3) In the above-described each illustrative embodiment, an example in which the low-capacity power supply circuit 30 is provided, and the storage circuit is configured by the smoothing/storage capacitor C3 included in the low-capacity power supply circuit 30 has been described. However, the present invention is not limited thereto. The low-capacity power supply circuit 30 may be omitted. In this case, the storage circuit needs only to be charged by supply of electric power from the switching power supply and apply the charged voltage to the power supply line, and may be configured, for example, by a single capacitor for storage, or a circuit including a capacitor for storage.

(4) In the first and second illustrative embodiments, an example in which the relay 40 is turned off during power-on of the printer 1 has been described. However, the present invention is not necessarily limited thereto. Even in a case where the relay 40 is turned on during power-on of the printer 1, it is possible to apply the present invention.

(5) In the above-described illustrative embodiment, an example obtained by applying the power supply system 100 disclosed by this specification, to an image processing apparatus has been described. However, the present invention is not limited thereto. The power supply system 100 can be applied to every apparatus having a normal mode and a power saving mode.

(6) In the above-described illustrative embodiment, an example in which the control device is configured by the mode control IC 52 has been described. However, the present invention is not limited thereto. The control device may be configured, for example, only by the ASIC 51 including the operation function of the mode control IC 52. Further, the control device may be configured by a plurality of other circuits, or may be configured by a CPU and other individual circuits.

What is claimed is:

1. A power supply system comprising:
a switching power supply configured to convert an AC voltage from an AC power supply into a predetermined DC voltage and to output the DC voltage;
a latching relay, which is provided at a preceding stage of the switching power supply on an AC input line, and which is configured to switch a connection state of the switching power supply with the AC power supply in response to an input of a relay drive signal;
a control device configured to generate a relay control signal for controlling the latching relay;
a relay drive circuit configured to generate the relay drive signal in response to an input of the relay control signal, and to drive the latching relay by the relay drive signal;
a battery configured to supply electric power to the control device and the relay drive circuit in a case where the control device and the relay drive circuit are connected; and
a switch configured to switch the connection state of the battery with respect to the control device and the relay drive circuit, the switch including:
a first contact point, which is connected to the battery; and
a second contact point, which is connected to a mode setting terminal and to the power supply line through a first diode;
wherein the control device comprises the mode setting terminal for setting any one of a power saving mode, in which the switching power supply and the AC power supply are in a disconnection state, and a normal mode, in which the switching power supply and the AC power supply are in a connection state;
wherein the control device is configured to be supplied with electric power from a storage circuit through the power supply line in the power saving mode; and
wherein the switch further functions as a mode setting switch for setting the power saving mode or the normal mode.

2. The power supply system according to claim 1, wherein the storage circuit is charged by supply of electric power from the switching power supply.

3. The power supply system according to claim 2, wherein the charged voltage of the storage circuit in the normal mode is set to be higher than a battery voltage of the battery by a predetermined value.

4. The power supply system according to claim 1, further comprising:
a signal generating circuit configured to generate a zero-cross detection signal corresponding to a zero-cross point of the AC power supply,
wherein the control device is configured to generate the relay control signal in response to the zero-cross detection signal, and
wherein the relay drive circuit is configured to drive the latching relay in response to the zero-cross detection signal.

5. The power supply system according to claim 1, further comprising:
a thermistor that is provided at a preceding stage of the latching relay on the AC input line.

6. The power supply system according to claim 5, further comprising:
a power detecting unit configured to detect existence/non-existence of supply of the AC power supply to the power supply system,
wherein in a case where the non-existence of supply of the AC power supply is detected, on an occasion of driving the latching relay by supplying the electric power to the control device and the relay drive circuit from the battery, the latching relay is driven after a thermistor cooling period which is a predetermined time period has elapsed, whereby the AC power supply and the switching power supply are connected.

7. The power supply system according to claim 6,
wherein the thermistor cooling period is set to a time period in which the charged voltage drops to a predetermined voltage enabling driving of the latching relay.

8. The power supply system according to claim 7,
wherein in a case where non-existence of supply of the AC power supply is detected during the power saving mode in which the switching power supply and the AC power supply are in the disconnection state, and in a case where non-existence of supply of the AC power supply is detected during the normal mode in which the switching power supply and the AC power supply are in the connection state, different voltage values are set as the predetermined voltage, respectively.

9. The power supply system according to claim 7,
wherein in a case where a predetermined time period elapses before the charged voltage drops to be lower than the predetermined voltage, the control device is configured to determine that there is supply of the AC power supply and to drive the latching relay so as to connect the switching power supply and the AC power supply.

10. The power supply system according to claim 6,
wherein upon the non-existence of supply of the AC power supply is detected during the normal mode in which the switching power supply and the AC power supply are in the connection state, the control device is configured to immediately drive the latching relay so as to disconnect the switching power supply and the AC power supply.

11. An image forming apparatus comprising:
the power supply system according to claim 1; and
an image forming unit configured to form an image with using the DC voltage supplied from the switching power supply.

12. A power supply system comprising:
a switching power supply configured to convert an AC voltage from an AC power supply into a predetermined DC voltage and to output the DC voltage;
a latching relay, which is provided at a preceding stage of the switching power supply on an AC input line, and which is configured to switch a connection state of the switching power supply with the AC power supply in response to an input of a relay drive signal;
a control device configured to generate a relay control signal for controlling the latching relay;
a relay drive circuit configured to generate the relay drive signal in response to an input of the relay control signal, and to drive the latching relay by the relay drive signal;
a battery configured to supply electric power to the control device and the relay drive circuit in a case where the control device and the relay drive circuit are connected;
a switch configured to switch the connection state of the battery with respect to the control device and the relay drive circuit;
a storage circuit configured to apply a charged voltage to a power supply line; and
a second diode that is provided on the power supply line between a contact point of the power supply line and the storage circuit and a contact point of the power supply line and the relay drive circuit,
wherein the second diode is provided in a direction to block a current flowing from the battery to the storage circuit in a case where the battery is connected to the control device and the relay drive circuit by the switch.

13. A power supply system comprising:
a switching power supply configured to convert an AC voltage from an AC power supply into a predetermined DC voltage and to output the DC voltage;
a latching relay, which is provided at a preceding stage of the switching power supply on an AC input line, and which is configured to switch a connection state of the switching power supply with the AC power supply in response to an input of a relay drive signal;
a control device configured to generate a relay control signal for controlling the latching relay;
a relay drive circuit configured to generate the relay drive signal in response to an input of the relay control signal, and to drive the latching relay by the relay drive signal;
a battery configured to supply electric power to the control device and the relay drive circuit in a case where the control device and the relay drive circuit are connected;
a switch configured to switch the connection state of the battery with respect to the control device and the relay drive circuit;
a storage circuit configured to apply a charged voltage to a power supply line; and
a low-capacity power supply circuit, connected to the AC input line at a preceding stage of the latching relay
wherein the low-capacity power supply circuit is configured to supply a predetermined electric power in a power saving mode, in which the switching power supply and the AC power supply are in a disconnection state,
wherein the low-capacity power supply circuit comprises:
a first capacitor that has a first electrode, which is connected to a first end of the AC power supply, and a second electrode;
a second capacitor that has a first electrode, which is connected to a second end of the AC power supply, and a second electrode;
a rectifying circuit, which is electrically connected between the second electrode of the first capacitor and the second electrode of the second capacitor, and which is configured to rectify an AC voltage to be applied to the first capacitor and the second capacitor; and
a smoothing capacitor, which is connected at a subsequent stage of the rectifying circuit, and which is configured to smoothen the AC voltage, and
wherein the storage circuit is configured by the smoothing capacitor and is configured to receive supply of electric power from the low-capacity power supply circuit in the power saving mode in which the switching power supply and the AC power supply are in the disconnection state.

* * * * *